United States Patent
Cordone et al.

(10) Patent No.: US 6,718,166 B2
(45) Date of Patent: Apr. 6, 2004

(54) MULTIPLE CARRIER ADAPTIVE NOTCH FILTER

(75) Inventors: Sean S. Cordone, Chicago, IL (US); Tan D. Nguyen, Bolton (CA)

(73) Assignee: Illinois Superconductor Corporation, Inc., Mount Prospect, IL (US)

( * ) Notice: Subject to any disclaimer, the term of this patent is extended or adjusted under 35 U.S.C. 154(b) by 0 days.

(21) Appl. No.: 10/151,648

(22) Filed: May 17, 2002

(65) Prior Publication Data

US 2003/0216122 A1 Nov. 20, 2003

(51) Int. Cl.[7] .................................................. H04B 1/10
(52) U.S. Cl. ................... 455/306; 455/63.1; 455/67.11; 455/296
(58) Field of Search .............................. 455/306, 63.1, 455/213, 296, 501, 513, 67.11, 67.13, 114.2, 115.1, 115.3, 134, 135, 226.1, 226.2

(56) References Cited

U.S. PATENT DOCUMENTS

| | | | |
|---|---|---|---|
| 3,732,500 A | 5/1973 | Dishal et al. | 328/167 |
| 3,781,705 A | 12/1973 | Dishal et al. | 331/17 |
| 3,783,397 A | 1/1974 | Dishal et al. | 329/110 |
| 3,887,222 A | 6/1975 | Hammond | 285/307 |
| 3,911,366 A | 10/1975 | Baghdady | 325/347 |
| 4,027,264 A | 5/1977 | Gutleber | 328/167 |
| 4,328,591 A | 5/1982 | Baghdady | 455/303 |
| 4,479,250 A | * 10/1984 | Flood | 455/213 |
| 4,513,249 A | 4/1985 | Baghdady | 328/150 |
| 4,805,126 A | 2/1989 | Rodems | 364/571.01 |
| 4,859,958 A | 8/1989 | Myers | 329/112 |
| 4,919,640 A | 4/1990 | Yanagibori | 455/164 |
| 4,947,361 A | 8/1990 | Smith et al. | 364/724.09 |
| 4,992,747 A | 2/1991 | Myers | 329/316 |
| 5,038,115 A | 8/1991 | Myers et al. | 331/2 |
| 5,097,221 A | 3/1992 | Miller | 329/318 |

(List continued on next page.)

FOREIGN PATENT DOCUMENTS

| | | |
|---|---|---|
| CA | 2288633 | 4/2000 |
| CA | 2260653 | 4/2001 |
| CN | 1173101 A | 2/1998 |
| EP | 0 704 986 A3 | 4/1996 |
| EP | 0 704 986 A2 | 4/1996 |
| EP | 0 812 069 A3 | 12/1997 |
| EP | 0 812 069 A2 | 12/1997 |
| WO | WO 0046929 | 8/2000 |

OTHER PUBLICATIONS

Written Opinion for International Application No. PCT/CA00/00100 dated Mar. 2, 2001.

International Preliminary Examination Report for International Application No. PCT/CA00/00100 Dated Apr., 27, 2001.

(List continued on next page.)

Primary Examiner—Nguyen T. Vo
Assistant Examiner—Thuan T. Nguyen
(74) Attorney, Agent, or Firm—Marshall, Gerstein & Borun LLP

(57) ABSTRACT

A multiple carrier adaptive notch filter (ANF) module selectively filters a received wideband communication signal to eliminate narrowband interference that lies within the frequency spectrum of the wideband communication signal. To determine the presence of narrowband interference, the multiple carrier ANF module scans various known narrowband channels that lie within the frequency spectrum of the wideband communication signal and determines signal strengths for each of the narrowband channels. The signal strengths from the narrowband channels are compared to a threshold that is derived from a statistical combination of the narrowband signal strengths. Narrowband channels having signal strengths that are greater than the threshold are determined to have interference.

53 Claims, 20 Drawing Sheets

U.S. PATENT DOCUMENTS

| | | | |
|---|---|---|---|
| 5,140,701 A | * 8/1992 | Zaks | 455/164.1 |
| 5,168,508 A | 12/1992 | Iwasaki et al. | 375/1 |
| 5,185,762 A | 2/1993 | Schilling | 375/1 |
| 5,193,210 A | 3/1993 | Nicholas et al. | 455/38.1 |
| 5,226,057 A | 7/1993 | Boren | 375/103 |
| 5,263,048 A | 11/1993 | Wade | 375/1 |
| 5,307,517 A | 4/1994 | Rich | 455/306 |
| 5,325,204 A | 6/1994 | Scarpa | 348/607 |
| 5,343,496 A | 8/1994 | Honig et al. | 375/1 |
| 5,410,750 A | 4/1995 | Cantwell et al. | 455/306 |
| 5,497,505 A | 3/1996 | Koohgoli et al. | 455/34.1 |
| 5,541,959 A | 7/1996 | Myers | 375/348 |
| 5,570,350 A | 10/1996 | Myer et al. | 370/18 |
| 5,612,978 A | * 3/1997 | Blanchard et al. | 375/350 |
| 5,613,230 A | 3/1997 | Gottfried et al. | 455/161.3 |
| 5,640,385 A | 6/1997 | Long et al. | 370/335 |
| 5,703,874 A | 12/1997 | Schilling | 370/335 |
| 5,758,275 A | 5/1998 | Cox | 455/307 |
| 5,926,761 A | 7/1999 | Reed et al. | 455/440 |
| 5,966,657 A | 10/1999 | Sporre | 455/425 |
| 5,974,101 A | 10/1999 | Nago | 375/350 |
| 5,978,362 A | 11/1999 | Lee et al. | 370/315 |
| 6,020,783 A | 2/2000 | Coppola | 327/556 |
| 6,035,213 A | 3/2000 | Tokuda et al. | 455/553 |
| 6,047,171 A | 4/2000 | Khayrallah et al. | 455/266 |
| 6,104,934 A | 8/2000 | Patton et al. | 455/561 |
| 6,115,409 A | 9/2000 | Upadhyay et al. | 375/144 |
| 6,205,334 B1 | 3/2001 | Dent | 455/434 |
| 6,215,812 B1 | 4/2001 | Young et al. | 375/144 |
| 6,426,983 B1 | 7/2002 | Rakib et al. | 375/346 |
| 6,560,445 B1 | * 5/2003 | Fette et al. | 455/91 |
| 2003/0054852 A1 | * 3/2003 | Ginesi et al. | 455/522 |

OTHER PUBLICATIONS

Written Opinion for International Application No. PCT/US01/11351 dated Apr. 25, 2002.

International Search Report for International Application No. PCT/US01/11351 dated Apr. 12, 2002.

Salgado–Galicia, Hector, et al., "A Narrowband Approach to Efficient PCS Spectrum Sharing Through Decentralized DCA Access Policies," IEEE Personal Communications, Feb. 1997, pp. 24–34.

H. Vincent Poor, et al., "Narrowband Interference Suppression in Spread Spectrum CDMA," IEEE Personal Communications Magazine, Third Quarter, 1994, pp. 14–27.

L. Milstein, "Interference Rejection Techniques in Spread Spectrum Communications," Proceedings of the IEEE, vol. 76, No. 6, Jun. 1998.

International Search Report for International Application No. PCT/CA00/00100 dated Apr. 6, 2002.

First Office Action in China for Application No. 00803299.8 dated Jun. 6, 2003.

* cited by examiner

US 6,718,166 B2

MULTIPLE CARRIER ADAPTIVE NOTCH FILTER

TECHNICAL FIELD

The present invention is directed to communication systems and, more particularly, to a technique for adaptive notch filtering a multiple carrier signal.

BACKGROUND ART

As shown in FIG. 1, an exemplary telecommunication system 10 may include mobile units 12, 13A, 13B, 13C, and 13D, a number of base stations, two of which are shown in FIG. 1 at reference numerals 14 and 16, and a switching station 18 to which each of the base stations 14, 16 may be interfaced. The base stations 14, 16 and the switching station 18 may be collectively referred to as network infrastructure.

During operation, the mobile units 12, 13A, 13B, 13C, and 13D exchange voice, data or other information with one of the base stations 14, 16, each of which is connected to a conventional land line telephone network. For example, information, such as voice information, transferred from the mobile unit 12 to one of the base stations 14, 16 is coupled from the base station to the telephone network to thereby connect the mobile unit 12 with a land line telephone so that the land line telephone may receive the voice information. Conversely, information, such as voice information may be transferred from a land line telephone to one of the base stations 14, 16, which in turn transfers the information to the mobile unit 12.

The mobile units 12, 13A, 13B, 13C, and 13D and the base stations 14, 16 may exchange information in either analog or digital format. For the purposes of this description, it is assumed that the mobile unit 12 is a narrowband analog unit and that the mobile units 13A, 13 B, 13C, and 131) are wideband digital units. Additionally, it is assumed that the base station 14 is a narrowband analog base station that communicates with the mobile unit 12 and that the base station 16 is a wideband digital base station that communicates with the mobile units 13A, 13B, 13C, and 13D.

Analog format communication takes place using, for example, narrowband 30 kilohertz (KHz) channels. The advanced mobile phone systems (AMPS) is one example of an analog communication system in which the mobile unit 12 communicates with the base station 14 using narrowband channels. Alternatively, the mobile units 13A, 13B, 13C, and 13D communicate with the base stations 16 using a form of digital communications such as, for example, code-division multiple access (CDMA) or time-division multiple access (TDMA). CDMA digital communication takes place using spread spectrum techniques that broadcast signals having wide bandwidths, such as, for example, 1.2288 megahertz (MHz) bandwidths.

The switching station 18 is generally responsible for coordinating the activities of the base stations 14, 16 to ensure that the mobile units 12, 13A, 13B, 13C, and 13D are constantly in communication with the base station 14, 16 or with some other base stations that are geographically dispersed. For example, the switching station 18 may coordinate communication handoffs of the mobile unit 12 between the base stations 14 and another analog base station as the mobile unit 12 roams between geographical areas that are covered by the two base stations.

One particular problem that may arise in the telecommunication system 10 is when the mobile unit 12 or the base station 14, each of which communicates using narrowband channels, interfere with the ability of the base station 16 to receive and process wideband digital signals from the digital mobile units 13A, 13B, 13C, and 13D. In such a situation, the narrowband signal transmitted from the mobile unit 12 or the base station 14 may interfere with the ability of the base station 16 to properly receive wideband communication signals.

As will be readily appreciated, the base station 16 may receive and process wideband digital signals from more than one of the digital mobile units 13A, 13B, 13C, and 13D. For example, the base station 16 may be adapted to receive and process four CDMA carriers 40A–40D that fall within a multi-carrier CDMA signal 40, as shown in FIG. 2. In such a situation, narrowband signals transmitted from more than one mobile units, such as, the mobile unit 12, may interfere with the ability of the base station 16 to properly receive wideband communication signals on any of the four CDMA carriers 40A–40D. For example, FIG. 3 shows a multi-carrier CDMA signal 42 containing four CDMA carriers 42A, 42B, 42C and 42D adjacent to each other wherein one of the CDMA carriers 42C has a narrowband interferer 46 therein. As shown in FIG. 3, it is quite often the case that the signal strengths of the CDMA carrier signals 42A–42D are not equal.

DESCRIPTION OF THE EMBODIMENTS

As disclosed in detail hereinafter, a system and/or a method for multiple channel adaptive notch filtering may be used in a communication system. In particular, such a system or method may be employed in a wideband communication system to protect against, or to report the presence of, narrowband interference, which has deleterious effects on the performance of the wideband communication system. Additionally, such a system and method may be operated to eliminate interference in CDMA carriers having other CDMA carriers adjacent thereto.

Figure 1:
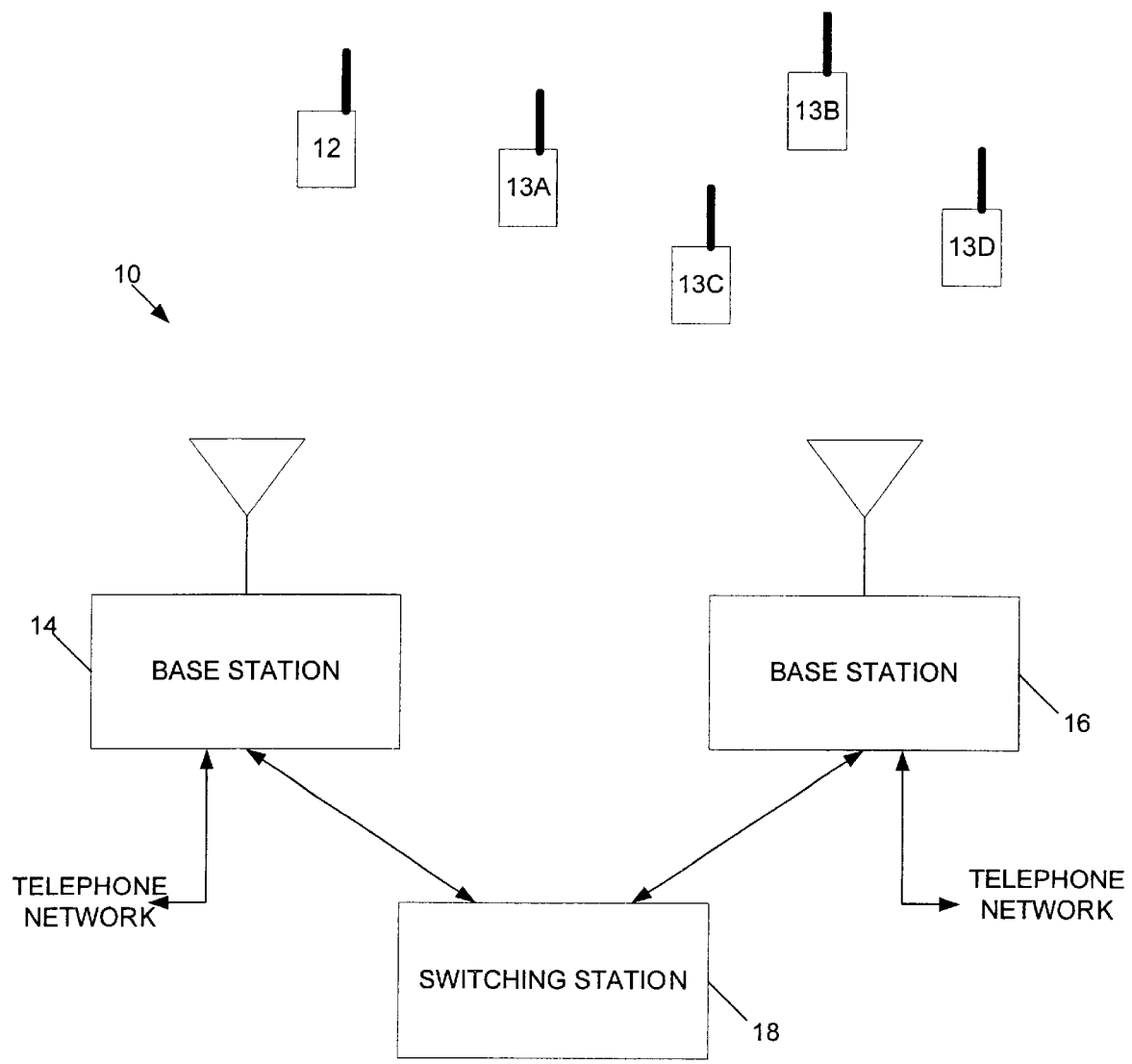
FIG. 1 is an exemplary illustration of a communication system.
Figure 4:
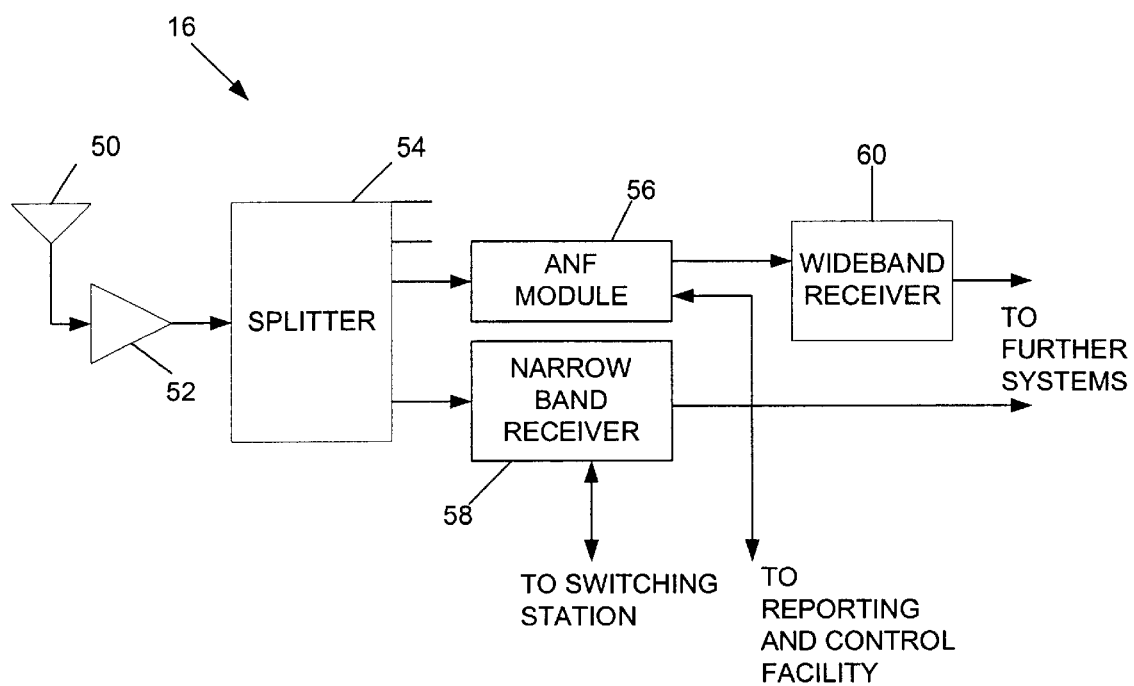
FIG. 4 is an exemplary illustration of a base station of FIG. 1.

As shown in FIG. 4, the signal reception path of the base station 16, which was described as receiving narrowband interference from the mobile unit 12 in conjunction with FIG. 1, includes an antenna 50 that provides signals to a low noise amplifier (LNA) 52. The output of the LNA 52 is coupled to a splitter 54 that splits the signal from the LNA 52 into a number of different paths, one of which may be coupled to a multiple carrier ANF module 56 and another of which may be coupled to a narrowband receiver 58. The output of the multiple carrier ANF module 56 is coupled to a wideband receiver 60, which may, for example, be embodied in a CDMA receiver or any other suitable wideband receiver. The narrowband receiver 58 may be embodied in a 15 KHz bandwidth receiver or in any other suitable narrowband receiver. Although only one signal path is shown in FIG. 4, it will be readily understood to those having ordinary skill in the art that such a signal path is merely exemplary and that, in reality, a base station may include two or more such signal paths that may be used to process main and diversity signals received by the base station 16.

The outputs of the narrowband receiver 58 and the wideband receiver 60 are coupled to other systems within the base station 16. Such systems may perform voice and/or data processing, call processing or any other desired function. Additionally, the multiple carrier ANF module 56 may also be communicatively coupled, via the Internet, telephone lines or any other suitable media, to a reporting and control facility that is remote from the base station 16. In some networks, the reporting and control facility may be integrated with the switching station 18. The narrowband receiver 58 may be communicatively coupled to the switching station 18 and may respond to commands that the switching station 18 issues.

Each of the components 50–60 of the base station 16 shown in FIG. 4, except for the multiple carrier ANF module 56, may be found in a conventional wideband cellular base station 16, the details of which are well known to those having ordinary skill in the art. It will also be appreciated by those having ordinary skill in the art that FIG. 4 does not disclose every system or subsystem of the base station 16 and, rather, focuses on the relevant systems and subsystems.

In particular, it will be readily appreciated that, while not shown in FIG. 4, the base station 16 includes a transmission system or subsystem.

During operation of the base station 16, the antenna 50 receives CDMA carrier signals that are broadcast from the mobile unit 13A, 13B, 13C and 13D and couples such signals to the LNA 52, which amplifies the received signals and couples the amplified signals to the splitter 54. The splitter 54 splits the amplified signal from the LNA 52 and essentially puts copies of the amplified signal on each of its output lines. The multiple carrier ANF module 56 receives the signal from the splitter 54 and, if necessary, filters the CDMA carrier signal to remove any undesired narrowband interference and couples the filtered CDMA carrier signal to the wideband receiver 60.

Figure 2:
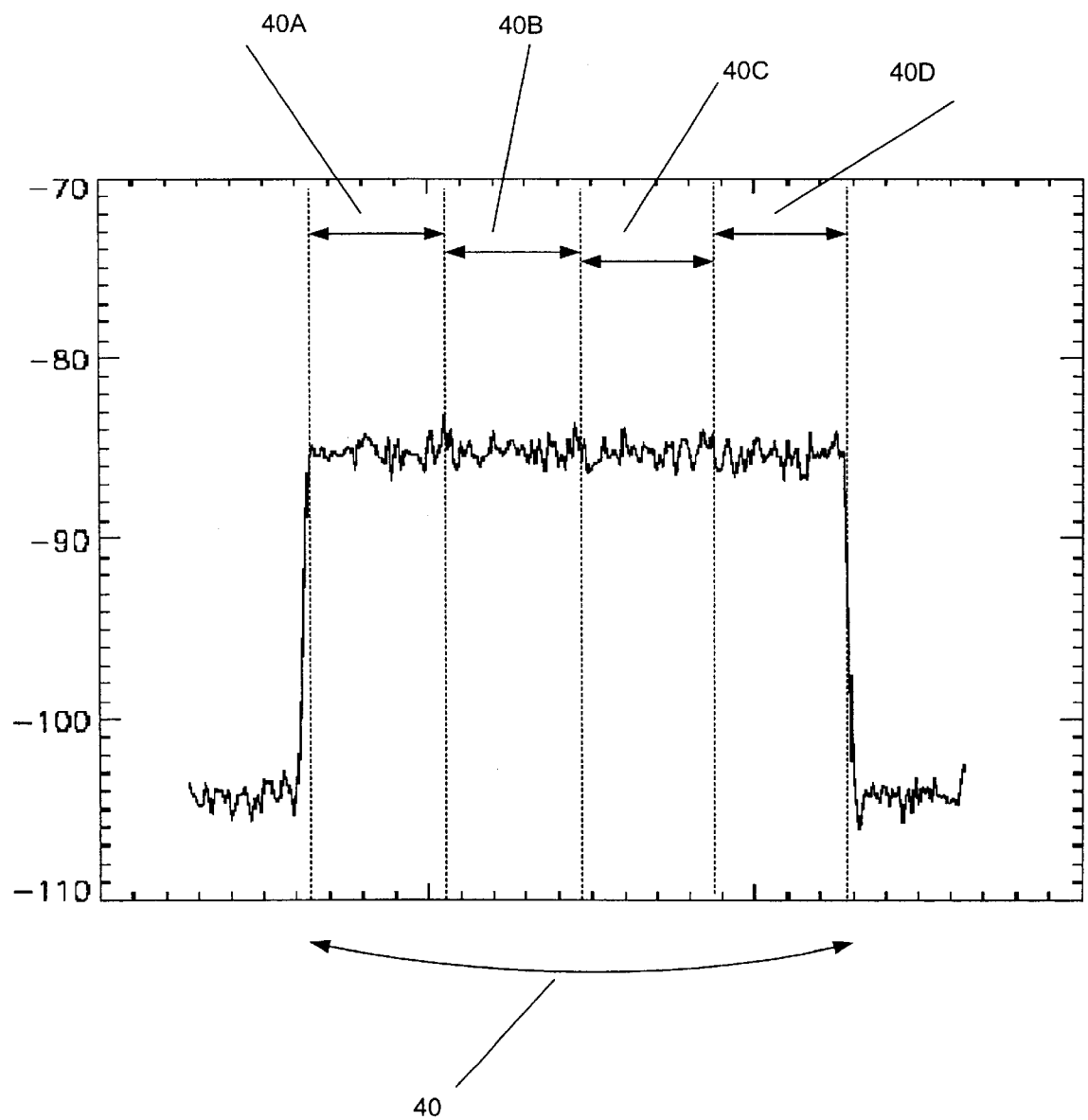
FIG. 2 is an exemplary illustration of a frequency spectrum of a four carrier CDMA signal.

As noted previously, FIG. 2 illustrates a frequency spectrum 40 of a CDMA carrier signal that may be received at the antenna 50, amplified and split by the LNA 52 and the splitter 54 and coupled to the multiple carrier ANF module 56. If the CDMA carrier signal received at the antenna 50 has a frequency spectrum 40 as shown in FIG. 2 without any narrowband interference, the multiple carrier ANF module 56 will not filter the CDMA carrier signal and will simply couple the wideband signal directly through the multiple carrier ANF module 56 to the wideband receiver 30.

Figure 3:
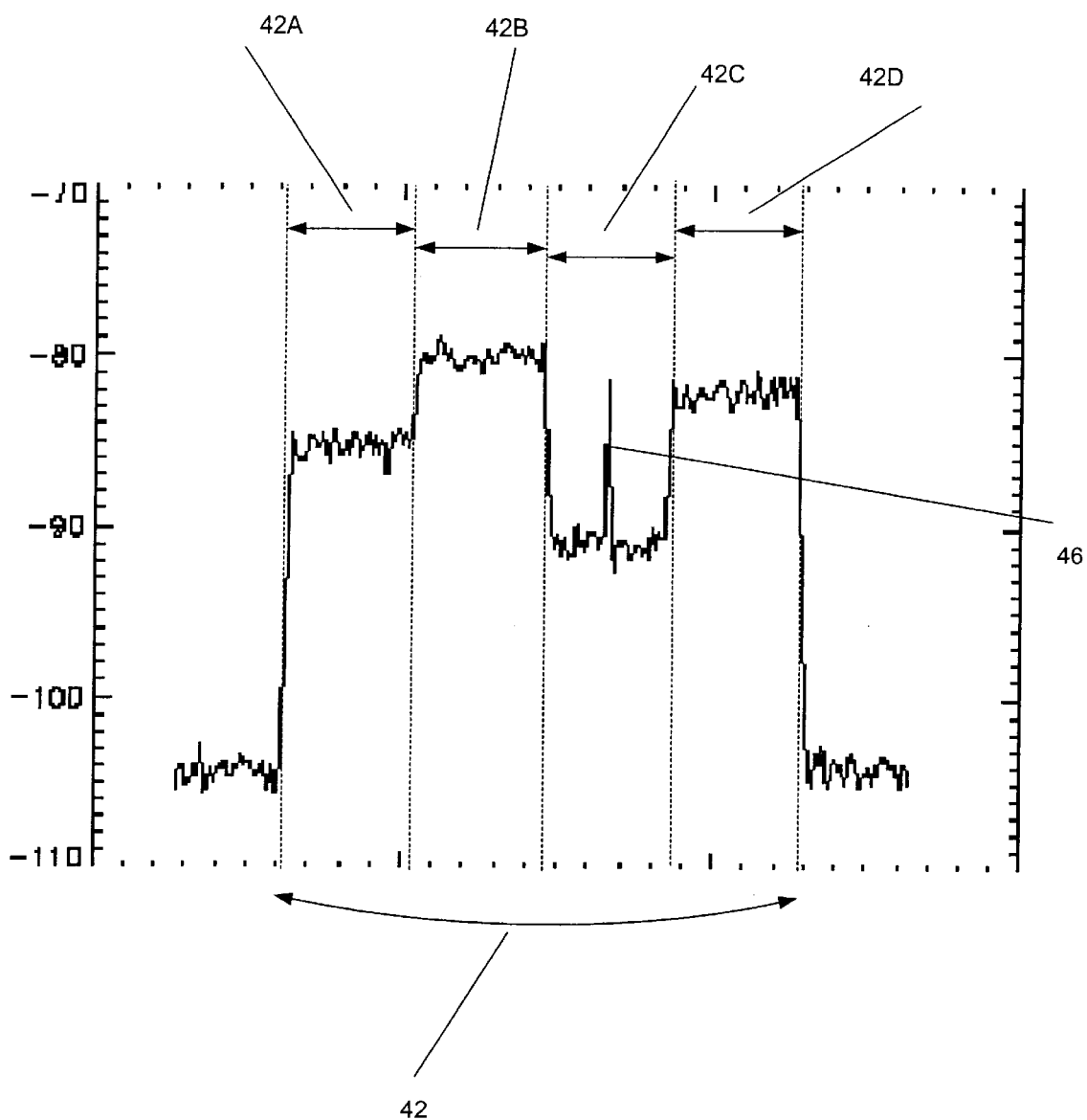
FIG. 3 is an exemplary illustration of a frequency spectrum of a four carrier CDMA signal showing unequal power balancing between the four CDMA carriers and including a narrowband interferer.
Figure 5:
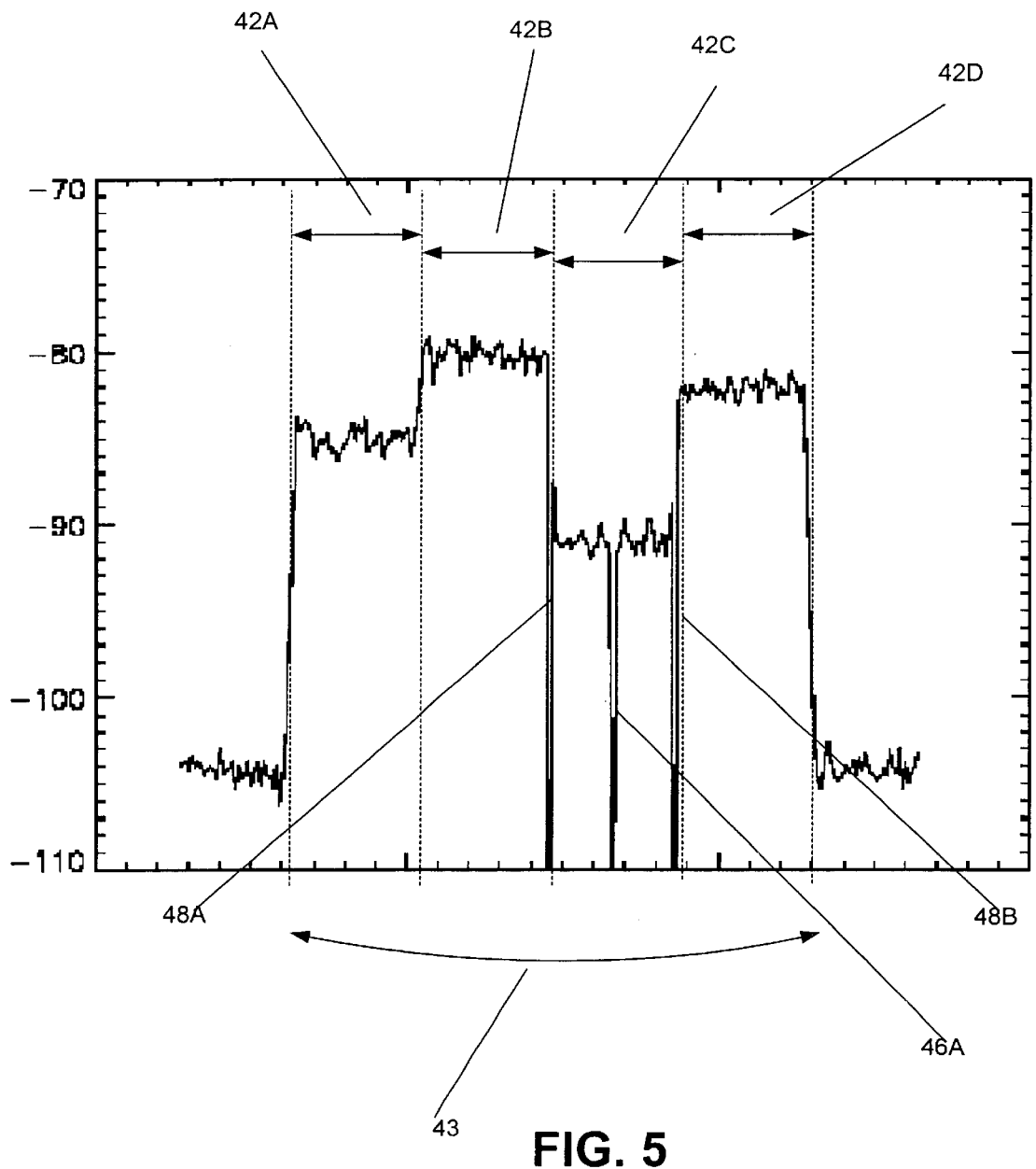
FIG. 5 is an exemplary illustration of a frequency spectrum of a four carrier CDMA signal having four CDMA carriers with notching of a narrowband interferer that results in falsing.

However, as noted previously, it is possible that the CDMA carrier signal transmitted by the mobile unit 13 and received by the antenna 50 has a frequency spectrum as shown in FIG. 3. which contains a multi-carrier CDMA signal 42 that includes not only the four CDMA carriers 42A, 42B, 42C and 42D from the mobile unit 12 and 13A, 13B, 13C and 13D having unequal CDMA carrier strengths, but it also includes narrowband interferer 46, as shown in FIG. 3, which may be from the mobile unit 13A. If a multi-carrier CDMA signal having a multi-carrier CDMA signal 42 including narrowband interferer 46 is received by the antenna 50 and amplified, split and presented to the multiple carrier ANF module 56, it will filter the multi-carrier CDMA signal 42 to produce a filtered frequency spectrum 43 as shown in FIG. 5.

The filtered multi-carrier CDMA signal 43 has the narrowband interferers 46 removed, as shown by the notch 46A. The filtered multi-carrier CDMA signal 43 is then coupled from the multiple carrier ANF module 56 to the wideband receiver 60, so that the filtered multi-carrier CDMA signal 43 may be demodulated. Although some of the multi-carrier CDMA signal 42 was removed during filtering by the multiple carrier ANF module 56, sufficient multi-carrier CDMA signal 43 remains to enable the wideband receiver 60 to recover the information that was broadcast by a mobile unit. Accordingly, in general terms, the multiple carrier ANF module 56 selectively filters multi-carrier CDMA signal to remove narrowband interference therefrom. Further detail regarding the multiple carrier ANF module 56 and its operation is provided below in conjunction with FIGS. 6–18.

Figure 6:
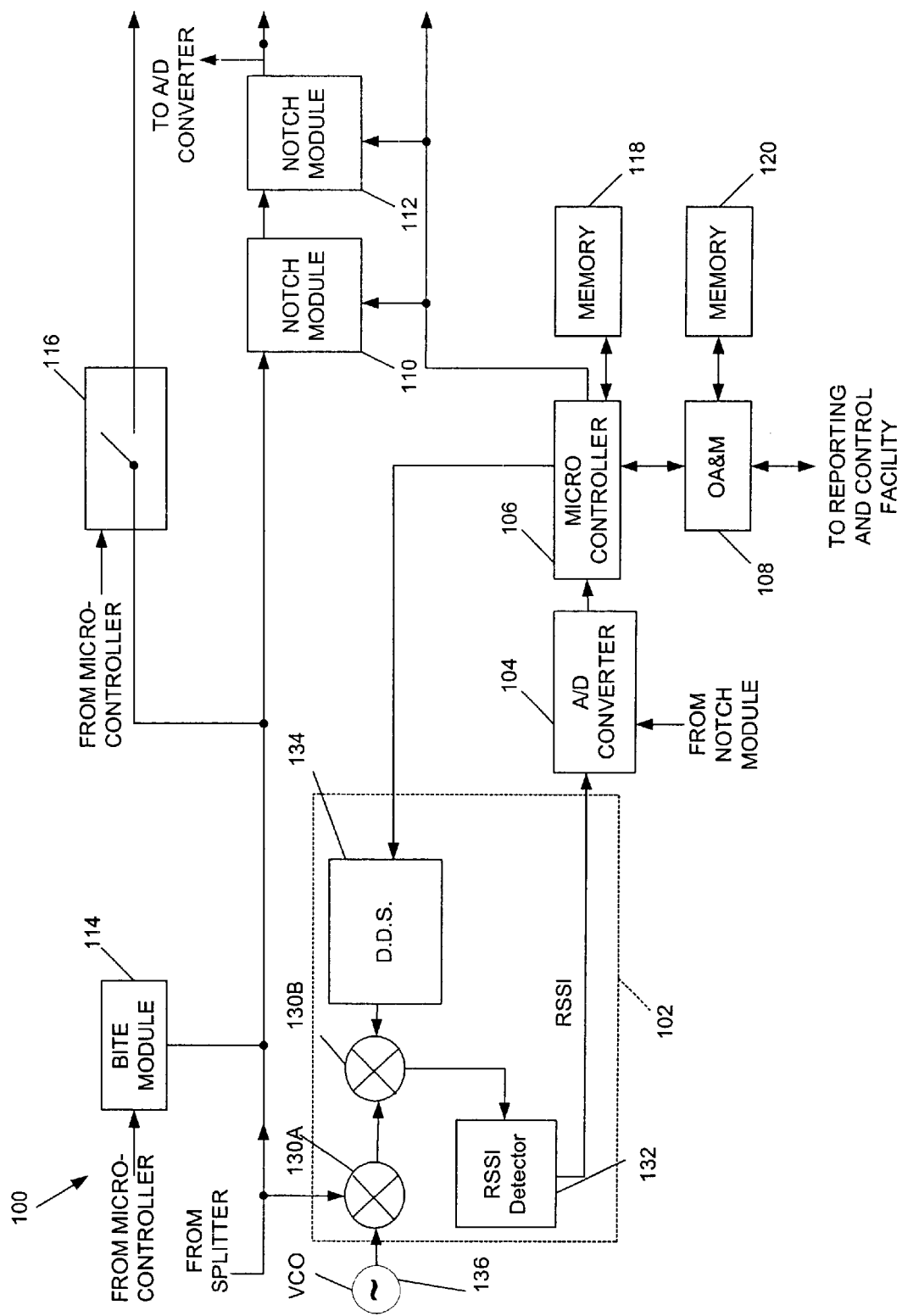
FIG. 6 is an exemplary illustration of one embodiment of the multiple carrier adaptive notch filter (ANF) module of FIG. 4.

In general, one embodiment of a multiple carrier ANF module 100, as shown in FIG. 6, scans the multi-carrier CDMA signal 42 provided by the splitter 54 and looks for narrowband interference therein. Such scanning may be implemented by scanning to various known narrowband channels that exist within the bandwidth of the CDMA carriers 42A, 42B, 42C and 42D of FIG. 3. For example, the multiple carrier ANF module 100 may scan to various AMPS channels that lie within the bandwidth of the CDMA carriers 42A, 42B, 42C and 42D. Alternatively, all of the multi-carrier CDMA signal 42 encompassed by the CDMA carriers 42A, 42B, 42C and 42D may be scanned. Either way, when narrowband interference is detected in the CDMA carriers, the multiple carrier ANF module 100 moves the narrowband interference into the notch of a notch filter, thereby filtering the CDMA carriers to remove the narrowband interference.

As shown in FIG. 6, multiple carrier ANF module 100, which may filter a number of narrowband interferers, generally includes a scanner 102, an analog to digital converter (A/D) 104, a microcontroller 106, an operations, alarms and metrics (OA&M) processor 108 and notch modules, two of which are shown in FIG. 6 at reference numerals 110 and 112. The microcontroller 106 may be embodied in a model PIC16C77-20P microcontroller, which is manufactured by Microchip Technology, Inc. The OA&M processor 108 may be embodied in a model 80386 processor, which is manufactured by Intel Corp., in a model HC11 microprocessor, which is manufactured by Motorola, Inc. or in any other suitable device. Although they are shown and described herein as separate devices that execute separate software instructions, those having ordinary skill in the art will readily appreciate that the functionality of the microcontroller 106 and the OA&M processor 108 may be merged into a single processing device.

Additionally, the second embodiment of the multiple carrier ANF module 100 may include a built in test equipment (BITE) module 114 and a bypass switch 116, which may be embodied in a model AS239-12 gallium arsenide single-pole, double-throw switch available from Hittite. The microcontroller 106 and the OA&M processor 108 may be coupled to external memories 118 and 120, respectively.

In general, the scanner 102, which includes mixers 130, a received signal strength indicator (RSSI) detector 132 and a direct digital synthesizer (DDS) 134, interacts with the AID converter 104 and the microcontroller 106 to detect the presence of narrowband interference in the multi-carrier CDMA signal provided by f;e P splitter 54. The RSSI detector 132 may be embodied in a National Semiconductor model NE604AD, whereas the DDS 134 may be embodied in Analog Devices model AD9850, or in model AD9851 or in any other suitable device. The mixer 130 may be embodied in a model MD-54-0005 mixer available from M/A-Com. Additionally, the A/D 104 may be completely integrated within the microcontroller 106 or may be a stand alone device coupled thereto.

As described in further detail below, once narrowband interference is detected in the multi-carrier CDMA signal from the splitter 54, the microcontroller 106, via serial bus 136, controls the notch modules 110, 112 to remove the detected narrowband interference. Although the embodiment of the multiple carrier ANF module 100, as shown in FIG. 6, includes two notch modules 110, 112, additional or fewer notch modules may be provided in the multiple carrier ANF module 100. The number of notch modules that may be used in the multiple carrier ANF module 100 is only limited by the signal degradation that each notch module contributes. Because multiple notch modules are provided, multiple narrowband interferers may be removed from the multi-carrier CDMA signal from the splitter 54. For example, if two notch modules were provided, a multi-carrier CDMA signal 42, having the frequency spectrum as shown in FIG. 3, may be processed by the multiple carrier ANF module 100 shown in FIG. 6 to produce a filtered multi-carrier CDMA signal 43, having the frequency spectrum as shown in FIG. 5.

The scanner 102 performs its function as follows. The signal from the splitter 54 is coupled first to the mixer 130A, which receives an input from the voltage controlled oscillator (VCO) 136, and then to the mixer 130B, which receives an input from a DDS 134. The mixer 130 mixes the signals from the splitter 54 down to an intermediate frequency (IF), which is the frequency that the RSSI detector 132 analyses to produce an RSSI measurement that is coupled to the A/D converter 104. The A/D converter 104 converts the RSSI signal from an analog signal into a digital signal that may be processed by the microcontroller 106. The microcontroller 106 compares the output of the A/D converter 104 to an adaptive threshold that the microcontroller 106 has previously determined. Details regarding how the microcontroller 106 determines the adaptive threshold are provided hereinafter. If the microcontroller 106 determines that the output from the A/D converter 104, which represents RSSI, exceeds the adaptive threshold, one of the notch modules 110, 112 may be assigned to filter the multi-carrier CDMA signal from the splitter 54 at the IF having an RSSI that exceeds the adaptive threshold.

The microcontroller 106 also programs the DDS 134 so that the mixers 130 move various portions of the multi-carrier CDMA signal from the splitter 54 to the IF that the RSSI detector 132 processes. For example, if there are 41 narrowband channels that lie within the frequency band of a particular CDMA carrier, the microcontroller 106 will sequentially program the DDS 134 so that each of the 41 channels is sequentially mixed down to the IF and provided to the RSSI detector 132 so that the RSSI detector 132 can produce RSSI measurements for each channel. Accordingly, the microcontroller 106 uses the DDS 134, the mixers 130 and the RSSI detector 132 to analyze the signal strengths in each of the 41 narrowband channels lying within the frequency band of the multi-carrier CDMA signal. By analyzing each of the channels that lie within the frequency band of the multi-carrier CDMA signal, the microcontroller 106 can determine the adaptive thresholds for each of the CDMA carriers and can determine whether narrowband interference is present in one or more of the narrowband channels within that CDMA carrier. Subsequently, the microcontroller 106 analyzes the signal strengths in each of the narrowband channels lying within the frequency band of the next CDMA carrier, if there is more than one CDMA carrier available.

Once narrowband channels having interferers are identified, the microcontroller 106 may program the notch modules 110, 112 to remove the most damaging interferers, which may, for example, be the strongest interferers. As described in detail hereinafter, the microcontroller 106 may also store lists of narrowband channels having interferers, as well as various other parameters. Such a list may be transferred to the reporting and control facility or a base station, via the OA&M processor 108, and may be used for system diagnostic purposes. Diagnostic purposes may include, but are not limited to, controlling the narrowband receiver 58 to obtain particular information relating to an interferer and re-tasking the interferer by communicating with its base station. For example, the reporting and control facility may use the narrowband receiver 58 to determine the identity of an interferer, such as a mobile unit, by intercepting the electronic serial number (ESN) of the mobile unit, which is sent when the mobile unit transmits information on the narrowband-channel. Knowing the identity of the interferer, the reporting and control facility may contact infrastructure that is communicating with the mobile unit and may request the infrastructure to change the transmit frequency of the mobile unit (i.e., the frequency of the narrowband channel on which the mobile unit is transmitting) or may request the infrastructure to drop communications with the interfering mobile unit all together.

Additionally, diagnostic purposes may include using the narrowband receiver 58 to determine a telephone number that the mobile unit is attempting to contact and, optionally handling the call. For example, the reporting and control facility may use the narrowband receiver 58 to determine that the user of the mobile unit was dialing 911, or any other emergency number, and may, therefore, decide that the narrowband receiver 58 should be used to handle the emergency call by routing the output of the narrowband receiver 58 to a telephone network.

Figure 7:
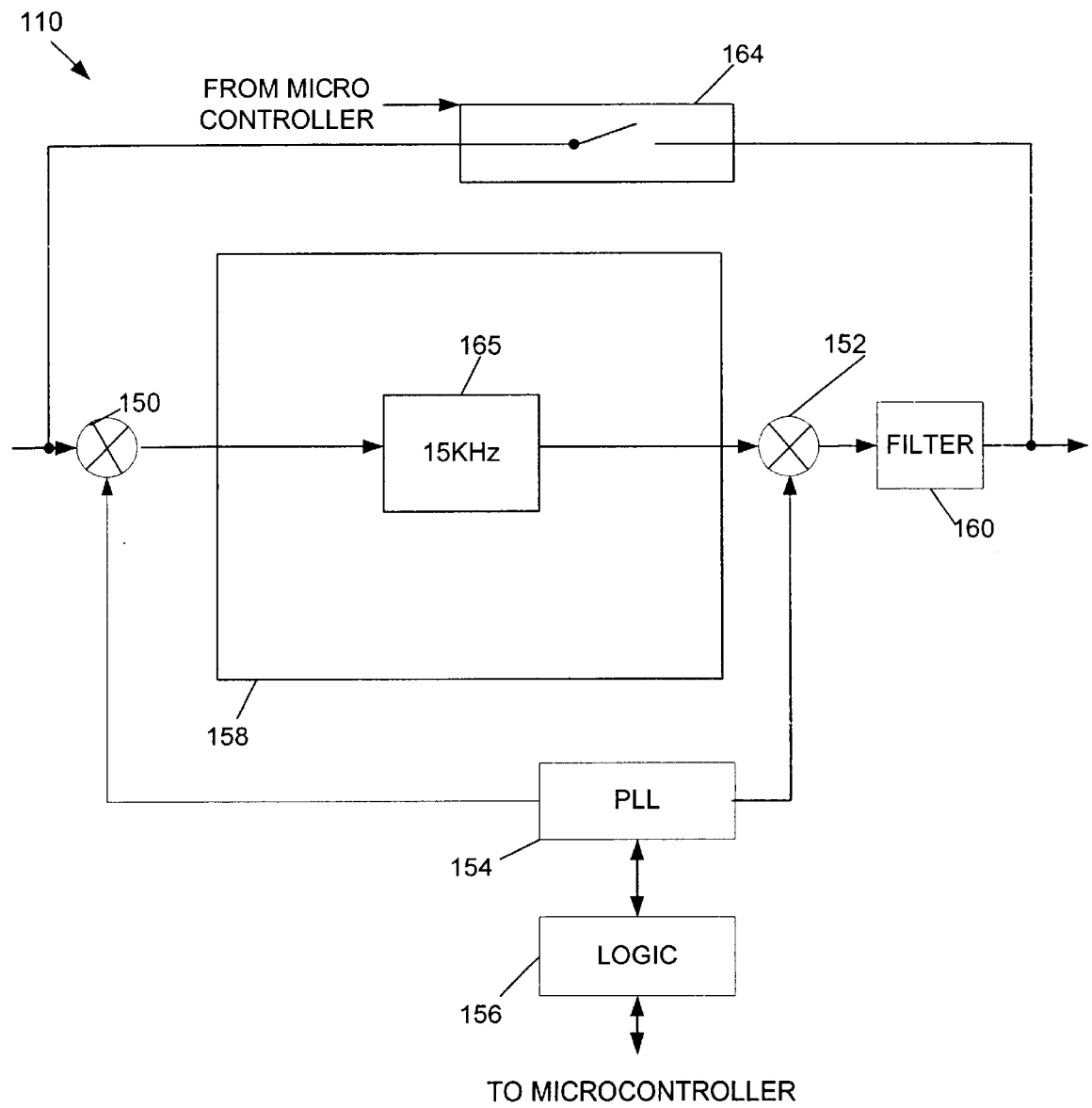
FIG. 7 is an exemplary illustration of one embodiment of the notch module of FIG. 6.

FIG. 7 reveals further detail of one of the notch modules 110, it being understood that any other notch modules used in the multiple carrier ANF module 100 may be substantially identical to the notch module 110. The notch module 110 includes first and second mixers 150, 152, each of which receives an input signal from a phase locked loop (PLL) 154 that is interfaced through a logic block 156 to the serial bus 136 of the microcontroller 106. Disposed between the mixers 150, 152 is a notch filter block 158, further detail of which is described below. In practice, the mixers 150, 152 may be embodied in model MD54-0005 mixers that are available from M/A-Com and the PLL 154 may be embodied in a model LMX2216TM frequency synthesizer that is commercially available from National Semiconductor or in any other suitable device.

During operation of the multiple carrier ANF module 100, the microcontroller 106 controls the PLL 154 to produce an output signal that causes the first mixer 150 to shift the frequency spectrum of the signal from the splitter 54 to an IF, which is the notch frequency of the notch filter block 158. Alternatively, in the case of cascaded notch modules, the notch module may receive its input from another notch module and not from the splitter 54. The output of the PLL 154 is also coupled to the second mixer 152 to shift the frequency spectrum of the signal from the notch filter block 158 back to its original position as it was received from the splitter 54 after the notch filter block 158 has removed narrowband interference therefrom. The output of the second mixer 152 is further coupled to a filter 160 to remove any undesired image frequencies that may be produced by the second mixer 152. The output of the filter 160 may be coupled to an additional notch module (e.g., the notch module 112) or, if no additional notch modules are used, may be coupled directly to the wideband receiver 60.

Additionally, the notch module 110 may include a bypass switch 164 that may be used to bypass the notch module 110 in cases where there is no narrowband interference to be filtered or in the case of a notch module 110 failure. For example, the microcontroller 106 closes the bypass switch 164 when no interference is detected for which the notch module 110 is used to filter. Conversely, the microcontroller 106 opens the bypass switch 164 when interference is detected and the notch module 110 is to be used to filter such interference.

As shown in FIG. 7, the notch filter block 158 includes a filter 165, which may be, for example a filter having a reject band that is approximately 15 KHz wide at −40 dB. The reject band of the filter 165 may be fixed at, for example, a center frequency of 150 MHz or at any other suitable frequency at which the IF of the mixer 150 is located.

Figure 8:
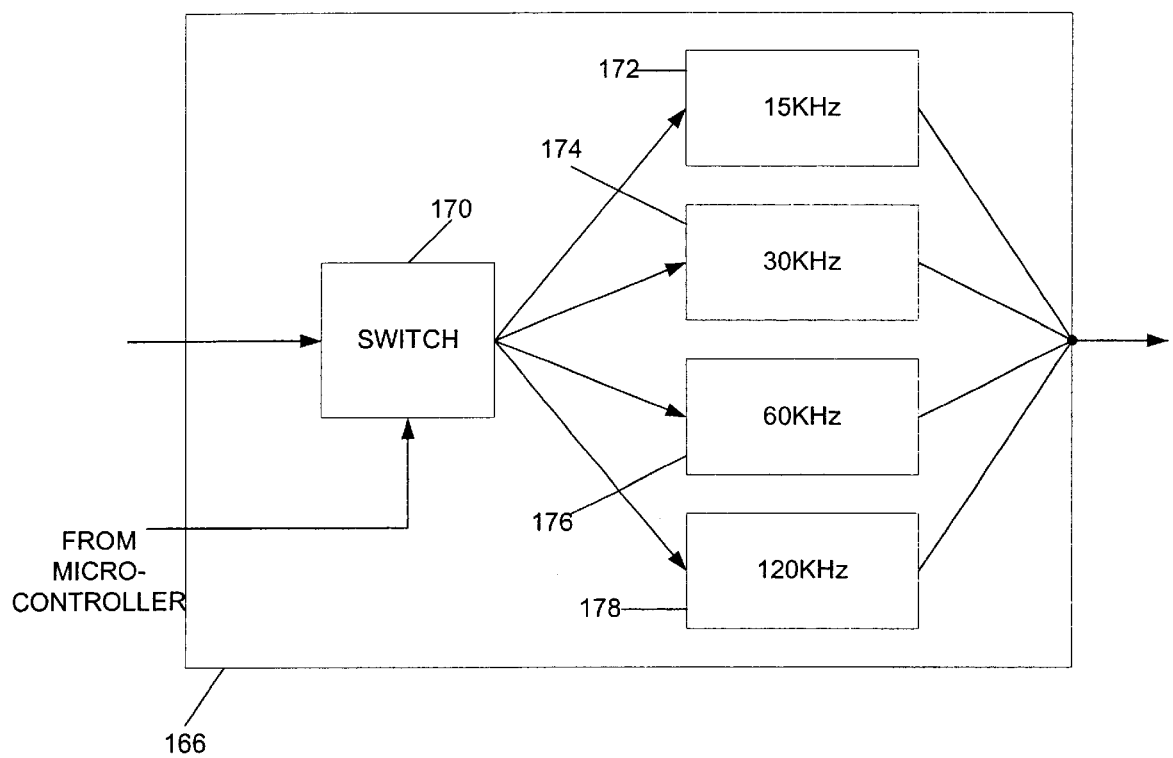
FIG. 8 is an exemplary illustration of an embodiment of the notch filter block of FIG. 7.

Although the notch filter block 158 of FIG. 7 shows only a single filter 165, as shown in FIG. 8, a second embodiment of a notch filter block 166 may include a switch 170 and multiple filters 172–178. In such an arrangement, each of the filters 172–178 has a notch frequency tuned to the IF produced by the first mixer 150. Additionally, each of the filters 172–178 may have a different reject bandwidth at −40 dB. For example, as shown in FIG. 8, the filters 172–178 have reject bandwidths of 15 KHz to 120 KHz. The use of filters having various reject bandwidths enables the multiple carrier ANF module 100 to select a filter having an optimal reject bandwidth to best filter an interferer.

During operation, of the second embodiment of the notch filter block 166, the microcontroller 106 controls the switch 170 to route the output signal from the first mixer 150 to one of the filters 172–178. The microcontroller 106, via the switch 170, selects the filter 172–178 having a notch switch best suited to filter interference detected by the microcontroller 106. For example, if the microcontroller 106 determines that there is interference on a number of contiguous narrowband channels,; the microcontroller 106 may use a filter 172–178 having a notch width wide enough to filter all such interference, as opposed to using a single filters to filter interference on each individual narrowband channel. Additionally, a single filter having a wide bandwidth may be used when two narrowband channels having interference are. separated by a narrowband channel that does not have narrowband interference. Although the use of a single wide bandwidth filter will filter a narrowband channel not having interference thereon, the wideband signal information that is lost is negligible.

Having described the detail of the hardware aspects of the system, attention is now turned to the software aspects of the system. Of course, it will be readily understood by those having ordinary skill in the art that software functions may be readily fashioned into hardware devices such as, for example, application specific integrated circuits (ASICs). Accordingly, while the following description pertains to software, such a description is merely exemplary and should not be considered limiting in any way.

That being said, FIGS. 9–12 and FIGS. 14–18 include a number of blocks representative of software or hardware functions or routines. If such blocks represent software functions, instructions embodying the functions may be written as routines in a high level language such as, for example, C, or any other suitable high level language, and may be compiled into a machine readable format. Alternatively, instructions representative of the blocks may be written in assembly code or in any other suitable language. Such instructions may be stored within the microcontroller 106 or may be stored within the external memory 118 and may be recalled therefrom for execution by the microcontroller 106.

Figure 9:
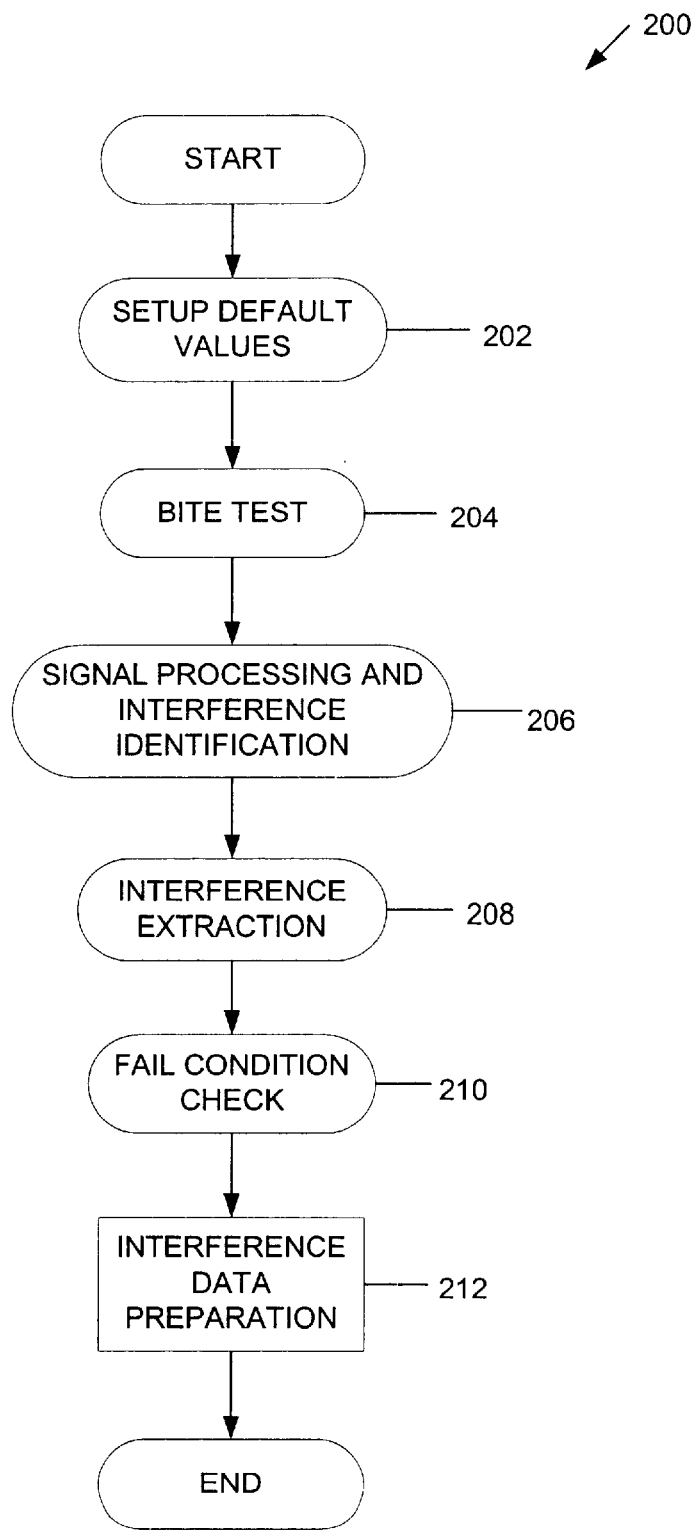
FIG. 9 is an exemplary flow diagram of a main routine executed by the microcontroller of FIG. 6.

A main routine 200, as shown in FIG. 9, includes a number of blocks or routines that are described at a high level in connection with FIG. 9 and are described in detail with respect to FIGS. 10–12, and FIGS. 14–18. The main routine 200 begins execution at a block 202 at which the microcontroller 102 sets up default values and prepares to carry out the functionality of the multiple carrier ANF module 100. After the setup default values function is complete, control passes to a block 204, which performs a built-in test equipment (BITE) test of the multiple carrier ANF module 100.

After the BITE test has been completed, control passes from the block 204 to a block 206, which performs signal processing and interference identification. After the interference has been identified at the block 206, control passes to a block 208 where the identified interference is extracted from the multi-carrier CDMA signal received by the multiple carrier ANF module 100.

After the interference has been extracted at the block 208, control passes to a block 210 at which a fail condition check is carried out. The fail condition check is used to ensure that the multiple carrier ANF module 100 is operating in a proper manner by checking for gross failures of the multiple carrier ANF module 100.

After the fail condition check completes, control passes from the block 210 to a block 212, which performs interference data preparation that consists of passing information produced by some of the blocks 202–210 from the microcontroller 106 to the OA&M 108. Upon completion of the interference data preparation, the main routine 200 ends its execution. The main routine 200 may be executed by the microcontroller 106 at time intervals such as, for example, every 20 milliseconds (ms).

Figure 10:
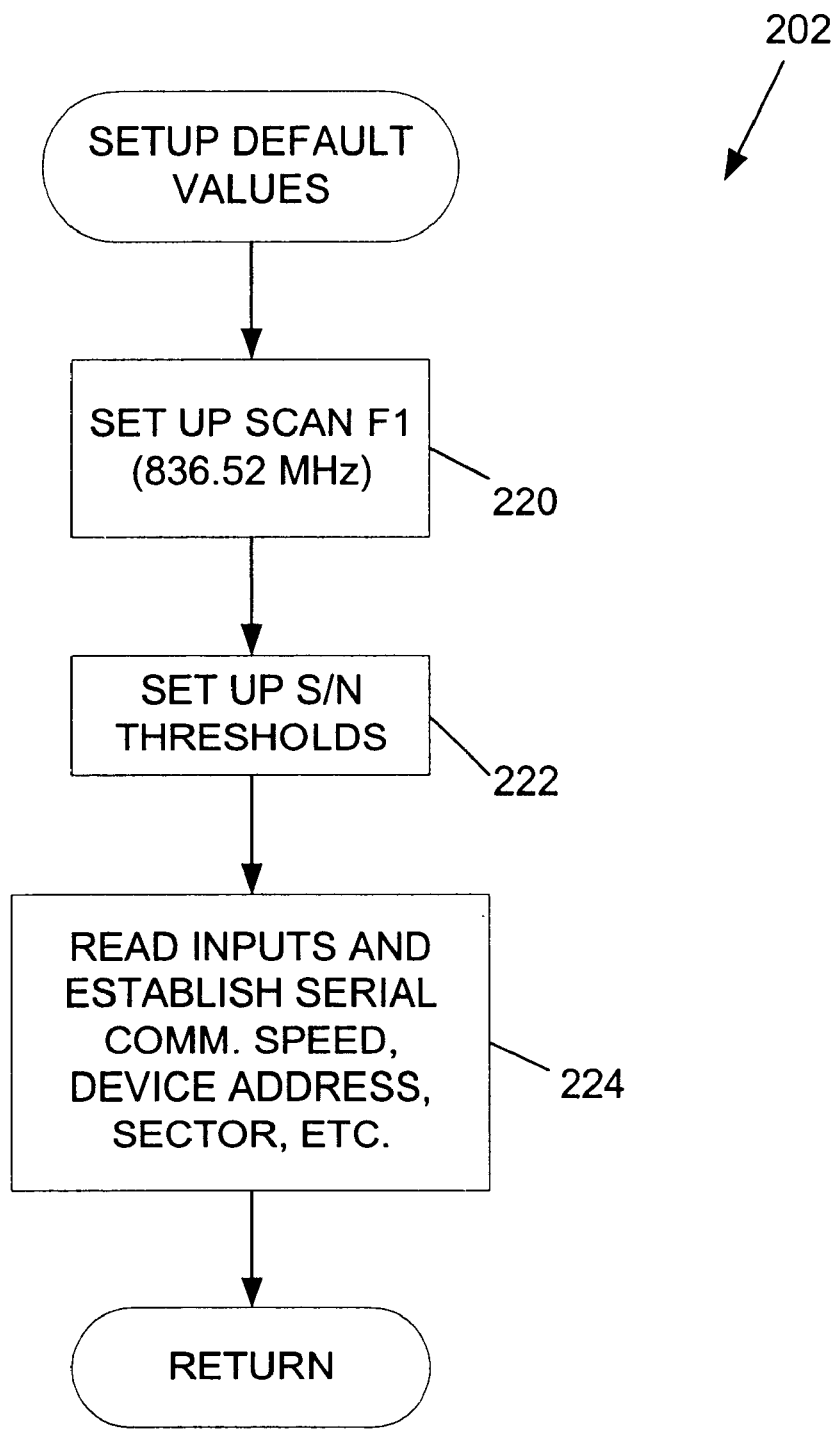
FIG. 10 is an exemplary flow diagram of a setup default values routine executed by the microcontroller of FIG. 6.

As shown in FIG. 10, the setup default values routine 202 begins execution at a block 220 at which the microcontroller 106 tunes the programmable local oscillator 134 to scan for interference on a first narrowband channel designated as F1. For example, as shown in FIG. 10, F1 may be 836.52 megahertz (MHz). Alternatively, as will be readily appreciated by those having ordinary skill in the art, the first narrowband channel to which the multiple carrier ANF module 100 is tuned may be any suitable frequency that lies within the frequency band of the multi-carrier CDMA signal.

After the microcontroller 106 is set up to scan for interference on a first frequency, control passes from the block 220 to a block 222, which sets up default signal to noise thresholds that are used to determine the presence of narrowband interference in the multi-carrier CDMA signal received from the splitter 54 of FIG. 4. Although subsequent description will provide detail on how adaptive thresholds are generated, the block 222 merely sets up an initial threshold for determining presence of narrowband interference.

After the default thresholds have been set at the block 222 control passes to a block 224 at which the microcontroller 106 reads various inputs, establishes serial communication with the notch modules 110, 112 and any other serial communication devices, as well as establishes communications with the OA&M processor 108. After the block 224 completes execution, the setup default values routine 202 returns control to the main program and the block 204 is executed.

Figure 11:
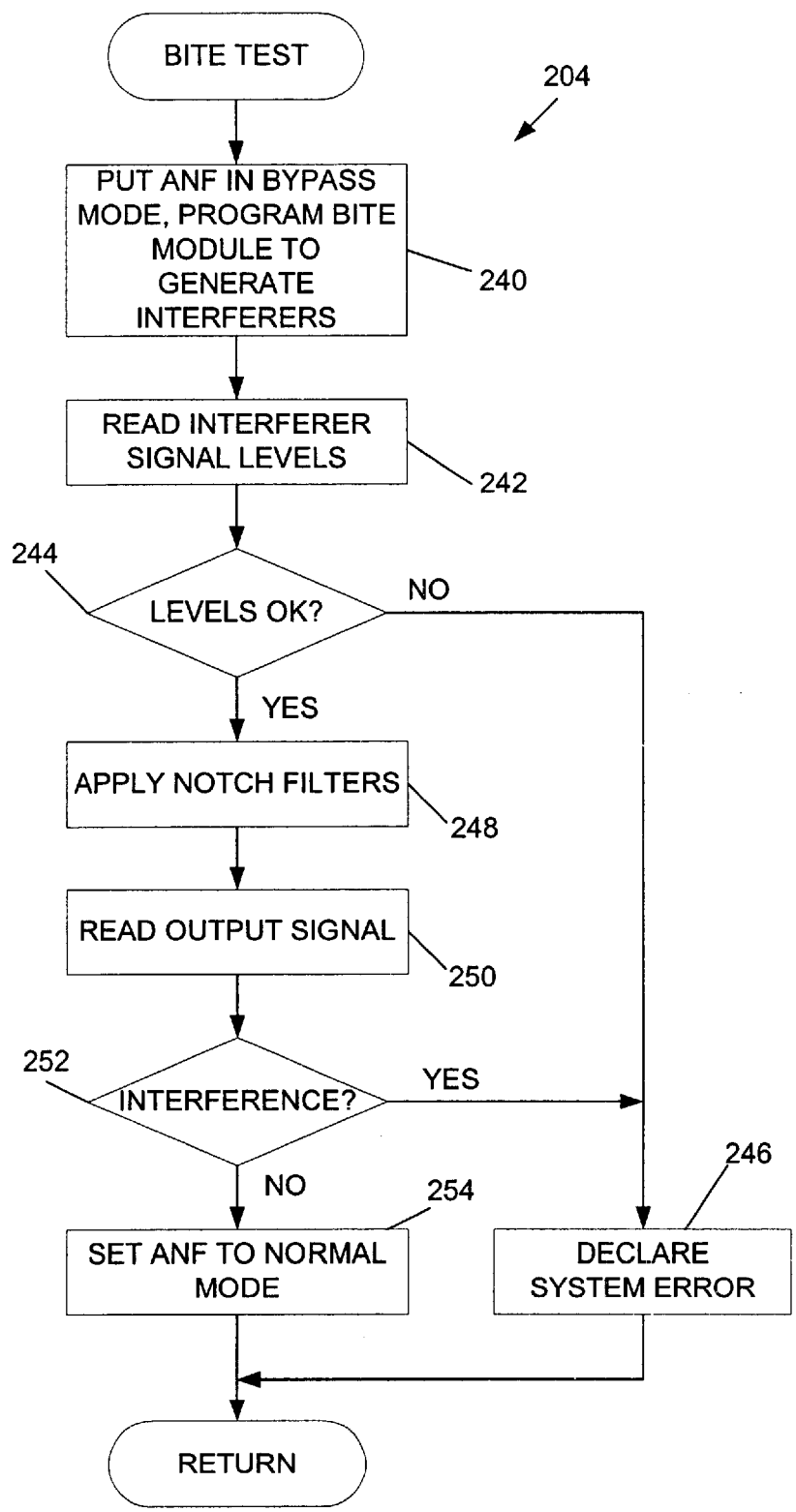
FIG. 11 is an exemplary flow diagram of a built in test equipment (BITE) test routine executed by the microcontroller of FIG. 6.

FIG. 11 reveals further detail of the BITE test routine 204, which begins execution after the routine 202 completes. In particular, the BITE test routine 204 begins execution at a block 240, at which the microcontroller 106 puts the notch modules 110, 112 in a bypass mode by closing their bypass switches 190. After the notch modules 110, 112 have been bypassed, the microcontroller 106 programs the BITE module 114 to generate interferers that will be used to test the effectiveness of the notch modules 110, 112 for diagnostic purposes. After the notch modules 110, 112 have been bypassed and the BITE module 114 is enabled, control passes from the block 240 to a block 242.

At the block 242, the microcontroller 106 reads interferer signal levels at the output of the notch module 112 via the A/D converter 104. Because the notch modules 110, 112 have been bypassed by the block 240, the signal levels at the output of the notch module 112 should include the interference that is produced by the BITE module 114.

After the interferer signal levels have been read at the block 242, a block 244 determines whether the read interferer levels are appropriate. Because the notch modules 110, 112 have been placed in bypass mode by the block 240, the microcontroller 106 expects to see interferers at the output of the notch module 112. If the levels of the interferer detected at the output of the notch module 112 are not acceptable (i.e., are too high or too low), control passes from the block 244 to a block. 246 where a system error is declared. Declaration of a system error may include the microcontroller 106 informing the OA&M processor 108 of the system error. The OA&M processor 108, in turn, may report the system error to a reporting and control facility. Additionally, declaration of a system error may include writing the fact that a system error occurred into the external memory 118 of the microcontroller 106.

Alternatively, if the block 244 determines that the interferer levels are appropriate, control passes from the block 244 to a block 248 at which the microcontroller 106 applies one or more of the notch modules, 110, 112. After the notch modules 110, 112 have been applied (i.e., not bypassed) by the block 248, control passes to a block 250, which reads the signal level at the output of the notch module 112. Because the BITE module 114 produces interference at frequencies to which the notch filters are applied by the block 248, it is expected that the notch modules 110, 112 remove such interference.

After the signal levels are read by the block 250, control passes to a block 252, which determines if interference is present. If interference is present, control passes from the block 252 to the block 246 and a system error is declared because one or more of the notch modules 110, 112 are not functioning properly because the notch modules 110, 112 should be suppressing the interference generated by the BITE module 114. Alternatively, if no interference is detected at the block 252, the multiple carrier ANF module 100 is functioning properly and is, therefore, set to a normal mode of operation at a block 254. After the block 254 or the block 246 have been executed, the BITE test routine 204 returns control to the main program 200, which begins executing the block 206.

Figure 12A:
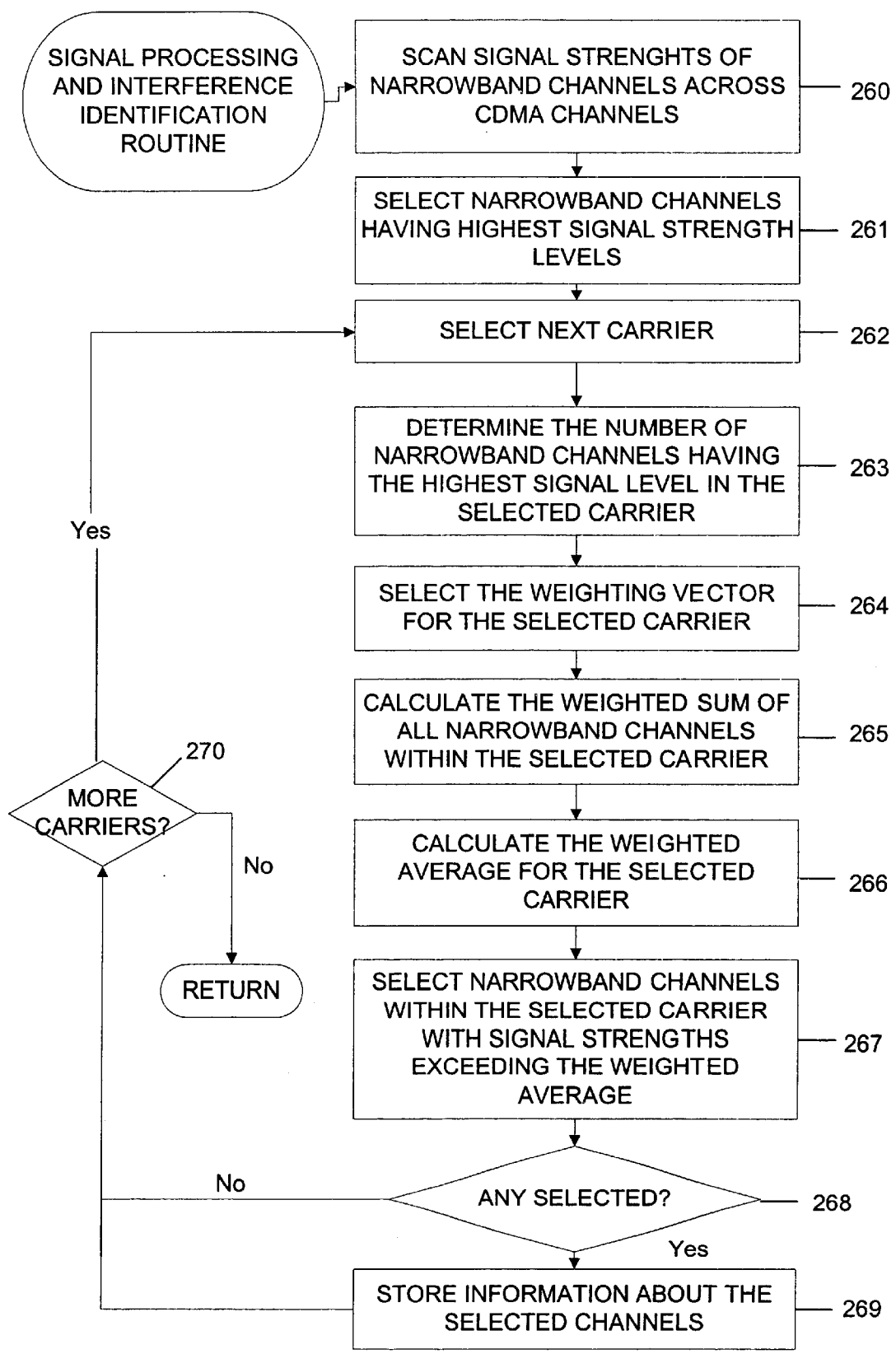
FIG. 12A is an exemplary flow diagram of a first signal processing and interference identification routine that may be executed by the microcontroller of FIG. 6.
Figure 12B:
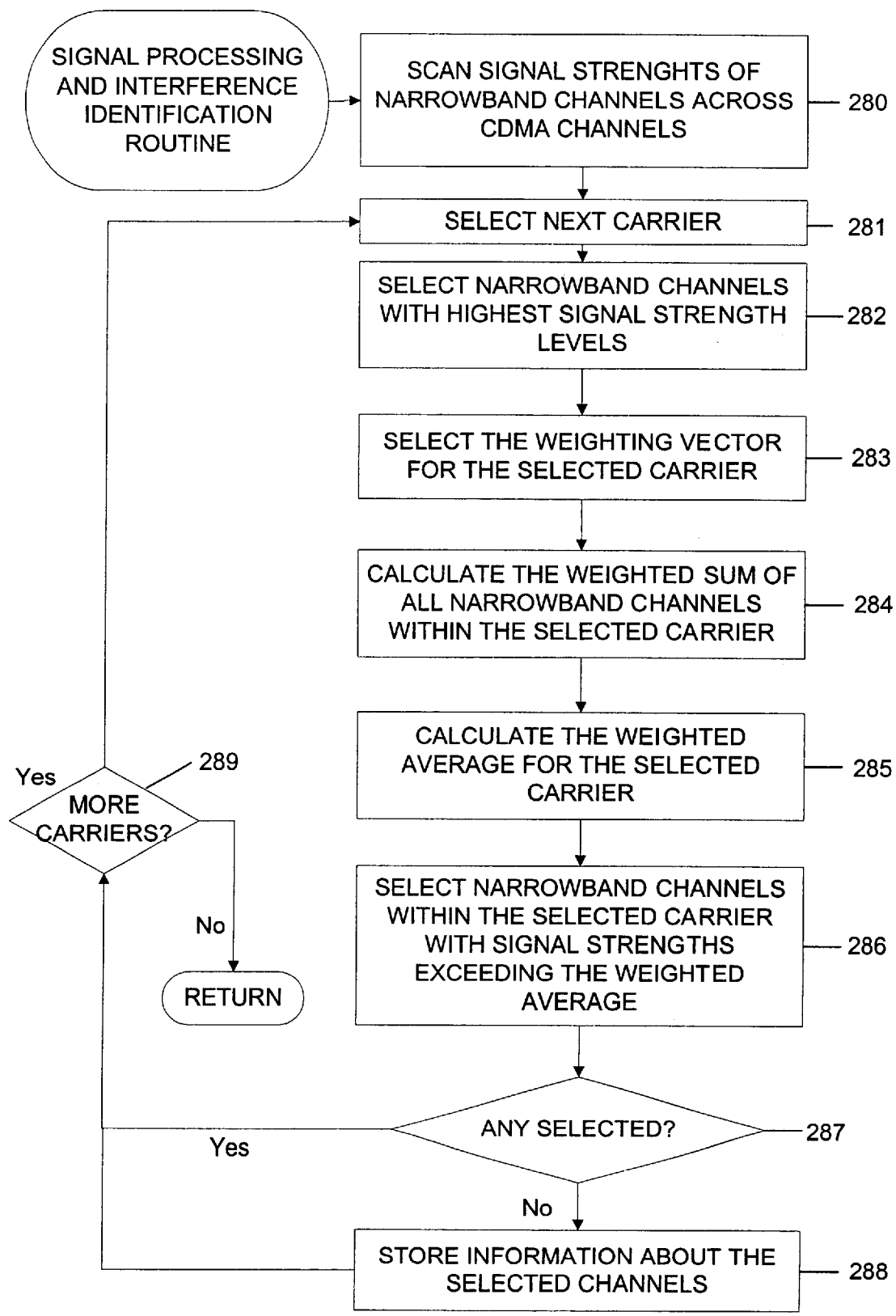
FIG. 12B is an exemplary flow diagram of a second signal processing and interference identification routine that may be executed by the microcontroller of FIG. 6.

The signal processing and interference identification routine 206 may be implemented by alternate routines as outlined by flowcharts in FIG. 12A and FIG. 12B. As per the flowchart in FIG. 12A, the processing and interference identification routine 206 begins execution at block 260. At block 260, the microcontroller 106 controls the DDS 134 so that the microcontroller 106 can read signal strength values for each of the desired narrowband channels via the RSSI detector 132 and the AID 104. The number of narrowband channels for which signal strength is read depends on the number of CDMA carriers in a given multi-carrier CDMA signal as well as on the number of narrowband channels disposed within each CDMA carrier. For example, in one particular embodiment, there may be four CDMA carriers in a given multi-carrier CDMA signai and there may be 41 narrowband channels per each of the four CDMA carrier for a total of 164 narrowband channels in the multi-carrier CDMA signal containing the four CDMA carriers. In this case, the microcontroller 106 will read signal strengths for each of the 164 different narrowband channels. The microcontroller 106 is designed to store in memory 118 the signal strengths for the narrowband channels.

At block 261, the microcontroller 106 assumes a total of n narrowband channels disposed across m CDMA carriers in a given multi-carrier CDMA signal. The microcontroller 106 also assumes that there are p notch modules 110, 112 available for filtering interference signals. Subsequently, at block 261, microcontroller 106 selects p narrowband channels with the highest signal strength levels from the total n*m narrowband channels within the multi-carrier CDMA signal. As explained hereinafter, the microcontroller 106 will compare the signal strengths of these p narrowband channels to an adaptive threshold calculated based on a statistical combination of signal strengths of a number of narrowband channels disposed within various CDMA carriers. Additionally, or alternatively, the threshold could be calculated based on signal strength of a given CDMA carrier and need not be based solely on signal strengths of various narrowband channels. At block 261 the microcontroller 106 also stores the information about the set of narrowband channels Cp with highest signal strengths in memory 118.

After block 261 completes execution, control passes to block 262, at which the microcontroller 106 selects a CDMA-carrier and begins the process of calculating an adaptive threshold for the selected CDMA carrier. At block 263 the microcontroller 106 determines the number of narrowband channels Cpi from the set of narrowband channels Cp with the highest signal strength levels that fall within the selected CDMA carrier. For example, in a given multi-carrier CDMA signal, there is only one narrowband channel with signal from Cp that fails within the selected CDMA spectrum, then Cpi for that CDMA spectrum would be 1.

After block 263 is completed, control passes to block 264, at which the microcontroller 106 selects a weighting vector Wi that is used to calculate the threshold level for the selected CDMA carrier. The weighting vector Wi provides the weights by which various narrowband signal strengths, as measured and stored in block 260, are multiplied (or otherwise combined) in the calculation of a weighted average that is used in determining adaptive threshold levels. The weighting vector Wi may be stored in memory 118 or may be calculated based on historical information about signal strength level of the CDMA carrier, signal strength levels of interference signals or any other information. For example, in one embodiment, the weighting vector Wi is such that narrowband signals that fall on the edge of a given CDMA carrier are weighted higher than other narrowband signals disposed within a given CDMA carrier. Specifically, the weighing vector Wi may be such that narrowband signals that fall on the edge of a given CDMA carrier are weighted by a factor of eight, while other narrowband signals disposed within a given CDMA carrier are weighted by a factor of one. However, depending upon the historical information, the weighting vector Wi could be selected with different weights for the narrowband signals across a CDMA carrier.

After the execution of block 264 completes, control passes to block 265. At block 265, the microcontroller 106 calculates the weighted sum of the signal strengths of the narrowband channels Ni within the selected CDMA carrier. While calculating the weighted sum, the microcontroller 106 may omit a narrowband channel signal that is disposed within the selected CDMA carrier and one that is selected as part of vector defined in block 261. For example, if there are 41 narrowband channels that are disposed within CDMA carrier and of these 41, one narrowband channel is identified as having highest signal strength level as per block 261, at block 265 the microcontroller 106 may only use the other 40 narrowband channels in calculating the weighted sum of the narrowband signal strengths. In a particular embodiment where the weighting vector has allocated a weight of eight to the narrowband channels at the edge of a given CDMA carrier and a weight of one to other narrowband channels, 38 narrowband channels will be weighted by one and two narrowband channels will be weighted by eight.

After the block 265 has completed execution, control passes to block 266, at which the microcontroller 106 calculates a threshold value for the selected CDMA carrier by dividing the weighted sum as calculated in block 265 by the number of signals that were used in calculating the weighted sum. The microcontroller 106 calculates the divisor used to divide the weighted sum as the difference between the total number Ni of narrowband channels that are disposed within the selected CDMA carrier and the number Cpi of narrowband channels within the selected CDMA carrier that are identified as having highest signal strength levels (i.e., Ni–Cpi). For example, in particular instance described above where a multi-carrier CDMA signal has 41 narrowband channels disposed within the selected CDMA carrier and one of them is identified as having a highest signal strength level, the weighed sum calculated in block 266 will be divided by 40. Additionally at block 266, the microcontroller 106 also adds a user preset offset t to the value obtained by dividing the weighted sum of signal strengths of narrowband channels as described above to get the threshold signal strength for the selected CDMA carrier. The user preset offset t can be supplied to the microcontroller 106 by a user or it can be stored in the memory 118 and updated periodically based on historical information.

At block 267 the microcontroller 106 compares the signal strength of each of the narrowband channels that are identified as having highest signal levels in block 270, and which are disposed within the selected CDMA carrier, to the threshold level calculated in block 266 for the selected CDMA carrier. For example, if two of the narrowband channels disposed within the selected CDMA carrier are identified as having the highest signal strength in block 261, at block 267 the microcontroller 106 compares the signal strengths of each one of them, one after the other. to the threshold level calculated in block 266.

At block 268, the microcontroller 106 determines if any of these narrowband channels identified as having highest signal level in block 261 has a signal level higher than the threshold level calculated in block 266, flags them as having an interference signal and stores information about them in memory 118, as shown in block 269. Once signal strengths of all narrowband channels disposed within selected CDMA carrier are compared against the threshold calculated for the selected CDMA carrier, control passes to block 270 where the microcontroller 106 determines if there are any more CDMA carriers for which the interference identification routine needs to be run. If there are more CDMA carriers found, control passes to block 262 where the microcontroller 106 repeats the steps 263 to 268 for the next CDMA carrier. If there are no more CDMA carriers found, the control returns back to block 208 of FIG. 9.

FIG. 12B is an alternate implementation of the signal processing and interference identification routine 206. The routine implemented in FIG. 12B is similar to the one in FIG. 12A in most aspects. However, the routine in FIG. 12B differs from the routine in FIG. 12A in that while in FIG. 12A, the microcontroller 106 selects p narrowband channels as having highest signal strength levels among all CDMA carriers in a given multi-carrier CDMA signal, in the routine in FIG. 12B, the microcontroller 106 selects p narrowband channels as having highest signal strength levels per each CDMA carrier in a given multi-carrier CDMA signal.

Thus, if there are four CDMA carriers in a given multi-carrier CDMA signal, and if the microcontroller is programmed to identify three narrowband channels per each CDMA carrier, in the routine of FIG. 12B, the microcontroller 106 will select a total of 12 narrowband channels having highest signal levels. This means that, in the implementation using routine of FIG. 12B, the microcontroller 106, does not have to determine the number of narrowband channels disposed within a given CDMA carrier that are identified as having highest signal strength (as done in block 263 of FIG. 12A). Subsequently, as described below, the calculation of the threshold in block 284 and 285 will be different from the calculation as performed by the microcontroller in block 265 and 266 of the routine identified in FIG. 12A.

At block 280, the microcontroller 106 controls the DDS 134 so that the microcontroller 106 can read signal strength values for each of the desired narrowband channels via the RSSI detector 132 and the AID 104. The number of narrowband channels for which signal strength is read depends on the number of CDMA carriers in a given multi-carrier CDMA signal as well as on the number of narrowband channels disposed within each CDMA carrier. For example, in one particular embodiment, there may be four CDMA carriers in a given multi-carrier CDMA signal and there may be 41 narrowband channels per each of the four CDMA carrier for a total of 164 narrowband channels in the multi-carrier CDMA signal containing the four CDMA carriers. In this case, the microcontroller 106 will read signal strengths for each of the 164 different narrowband channels. The microcontroller 106 is designed to store in memory 118 the signal strengths for the narrowband channels.

At block 281, microcontroller 106 selects a CDMA carrier for identifying interferences within the selected CDMA carrier. At block 281 the microcontroller 106 assumes that there are p notch modules 110, 112 available for filtering interference signals per each CDMA carrier. Subsequently, at block 282, the microcontroller 106 selects p narrowband channels with highest signal strength levels among signal strengths of all the narrowband channels disposed within the selected CDMA carrier. As explained hereinafter, the microcontroller 106 will compare the signal strengths of these p narrowband channels within the selected CDMA carrier having the highest signal strength to an adaptive threshold calculated based on a statistical combination of signal strengths of a number of narrowband channels disposed within the selected CDMA carrier.

At block 283, microcontroller 106 begins the process of calculating adaptive threshold for the selected CDMA carrier, by selecting a weighting vector Wi that is used to calculate the threshold level for the selected CDMA carrier. The weighting vector Wi provides the weights by which various narrowband signal strengths, as measured and stored in block 280, are multiplied (or otherwise combined) in the calculation of a weighted average that is used in determining adaptive threshold levels. The weighting vector Wi may be stored in memory 118 or may be calculated based on historical information about signal strength level of the CDMA carrier, signal strength levels of interference signals or any other information. For example, in one embodiment, the weighting vector Wi is such that narrowband signals that fall on the edge of a given CDMA carrier are weighted higher than other narrowband signals disposed within a given CDMA carrier. Specifically, the weighing vector Wi may be such that narrowband signals that fall on the edge of a given CDMA carrier are weighted by a factor of eight, while other narrowband signals disposed within a given CDMA carrier are weighted by a factor of one. However, depending upon the historical information, the weighting vector could be selected with different weights for the narrowband signals across a CDMA carrier. As explained above, such weighting factors are used so that the multiple carrier ANF does not allocate a notch to a narrowband channel when no interferer is present, a condition referred to hereinafter as a falsing mode.

After the execution of block 283 completes, control passes to block 284. At block 284, the microcontroller 106 calculates the weighted sum of the signal strengths of narrowband channels within the selected CDMA carrier. While calculating the weighted sum, the microcontroller 106 may omit signal strengths of p narrowband channels disposed within the selected CDMA carrier and selected in block 282 as narrowband channels having highest signal strengths. For example, if there are 41 narrowband channels that are disposed within the selected CDMA carrier and of these 41, three narrowband channels are selected as having highest signal strength level as per block 282, at block 284 the microcontroller 106 will only use the signal strengths of the other 38 narrowband channels in calculating the weighted sum of the narrowband signal strengths. In a particular embodiment where the weighting vector has allocated a weight of eight to the narrowband channels at the edge of a given CDMA carrier and a weight of one to other narrowband channels, 36 narrowband channels will be weighted by one and two narrowband channels will be weighted by eight.

After the block 284 has completed execution, control passes to block 285, at which the microcontroller 106 calculates a threshold value for the selected CDMA carrier by dividing the weighted sum as calculated in block 284 by the number of signals that were used in calculating the weighted sum. The microcontroller 106 calculates the divisor used to divide the weighted sum as the difference between the total number of narrowband channels that are disposed within the selected CDMA carrier and the number of narrowband channels within the selected CDMA carrier that are selected as having highest signal strength levels in block 282. For example, in particular instance described above where 41 narrowband channels are disposed within the selected CDMA carrier and three of them are selected as having a highest signal strength level in 282, the weighed sum calculated in block 266 will be divided by 38. Additionally at block 285, the microcontroller 106 also adds a user preset offset t to the value obtained by dividing the weighted sum of signal strengths of narrowband channels as described above to get the threshold signal strength for the selected CDMA carrier. The user preset offset t can be supplied to the microcontroller 106 by a user or it can be stored in the memory 118 and updated periodically based on historical information.

At block 286 the microcontroller 106 compares the signal strength of each of the narrowband channels that are identified as having highest signal levels in block 282 to the threshold level calculated in block 285 for the selected CDMA carrier. For example, if three of the narrowband channels disposed within the selected CDMA carrier are selected as having the highest signal strength in block 282, at block 286 the microcontroller 106 compares the signal strengths of each one of them, one after the other, to the threshold level calculated in block 285.

At block 287, the microcontroller 106 determines if any of these narrowband channels selected as having highest signal level in block 282 has a signal level higher than the threshold level calculated in block 285, flags them as having an interference signal, and stores information about them in memory 118, as shown in block 288. Once signal strengths of all narrowband channels disposed within selected CDMA carrier are compared against the threshold calculated for the selected CDMA carrier, control passes to block 289 where the microcontroller 106 determines if there are any more CDMA carriers for which the interference identification routine needs to be run. If there are more CDMA carriers found, control passes to block 281 where the microcontroller 106 repeats the steps 282 to 287 for the next CDMA carrier.

If there are no more CDMA carriers found, the control returns back to block 208 of FIG. 9.

Using the weighted vector Wi to calculate a threshold for a CDMA carrier against which the signal strengths of various narrowband channels disposed within the given CDMA carrier and allocating notches to only those narrowband channels that have signal strengths higher than such a threshold eliminates the problem of falsing, as described below, that is caused by unequal signal strengths of adjacent CDMA carriers.

A major falsing mode identified for a multi-carrier ANF unit without weighting may occur due to CDMA carrier power imbalances. The result of a multi-carrier ANF operating in the falsing mode is illustrated in FIG. 5 As explained above, FIG. 5 shows a frequency spectrum of a multi-carrier CDMA signal 43 showing unequal power balancing between four CDMA carriers 42A, 42B, 42C, and 42D with notching of a narrowband interferer 46A that also results in falsing as illustrated by notches 48A and 48B. FIG. 3 shows the multi-carrier CDMA signal 42 that is processed by a multi-carrier ANF module 16 shown in FIG. 4 without using any weighting vector to generate the multi-carrier CDMA signal 43 with a frequency spectrum as shown in FIG. 5. Due to carrier power imbalance between CDMA carrier 42B and 42C, the signal strength of the narrowband signal falling at the edge of CDMA carrier 42C adjacent to CDMA carrier 42B measures higher in strength than the threshold calculated based on un-weighted average of all narrowband signal strengths falling within CDMA carrier 42C. Subsequently, a multi-carrier ANF that does not use weighting vector considers the narrowband channel falling at the edge of CDMA carrier 42C to have an interferer present in that channel and allocates a notch module to such a narrowband channel to filter the presumed interferer. For example, in FIG. 5, it can be seen that narrowband channels 48A and 48B are filtered due to such falsing mode.

Figure 13:
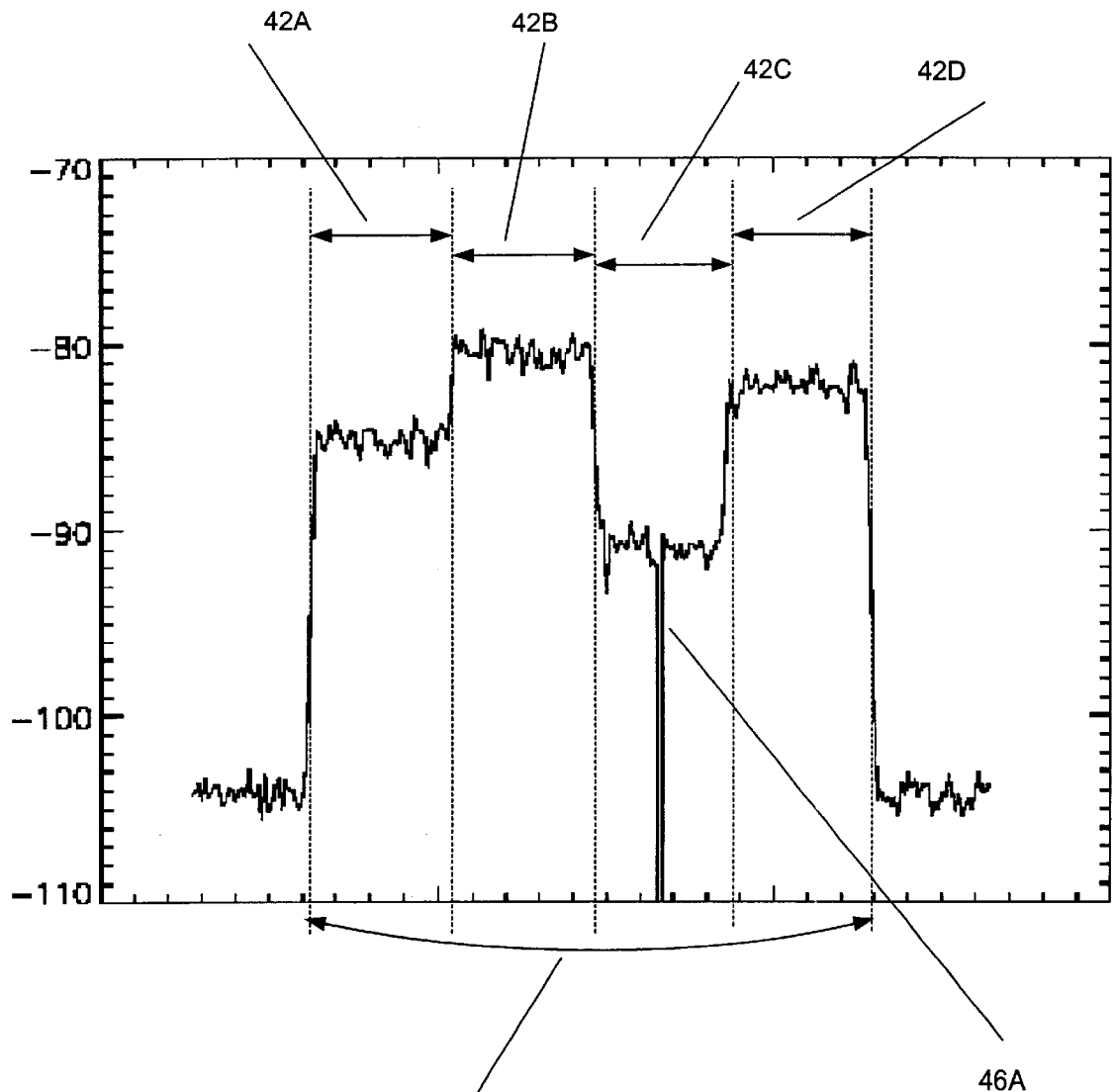
FIG. 13 is an exemplary illustration of a frequency spectrum of a four carrier CDMA signal having four CDMA carriers after successful notching of a narrowband interferer using boundary weighting.

However, using a weighting vector to calculate a threshold for a CDMA carrier 42C as identified in FIG. 3, that weights the signal strengths of narrowband channels falling at the edge of CDMA carrier 42C by 8 while it weights the signal strengths of narrowband channels falling within the CDMA carrier 42C by only one. Because of the power imbalance between 42C and 42D, the signal strength of the narrowband channel at the edge of 42C adjacent to 42D will have higher signal strength than those narrowband channels falling within 42C. The higher weight given to the signal strength of this narrowband channel at the edge results in higher threshold value, and when the signal strength of such a narrowband channel at the edge of 42C is compared against this higher threshold value, it will still be lower than the threshold. Subsequently, no notch will be allocated to filter such a narrowband channel falling at the edge of 42C. The result of filtering a multi-carrier CDMA signal shown 42 using a multi-carrier ANF using weighting vector to calculate a threshold is shown in FIG. 13. As shown here, because no notches are allocated to narrowband channels at the edge of CDMA carrier 42C, there is no false filtering of narrowband channels at the edges of 42C in the output multi-carrier CDMA signal 44.

Figure 14:
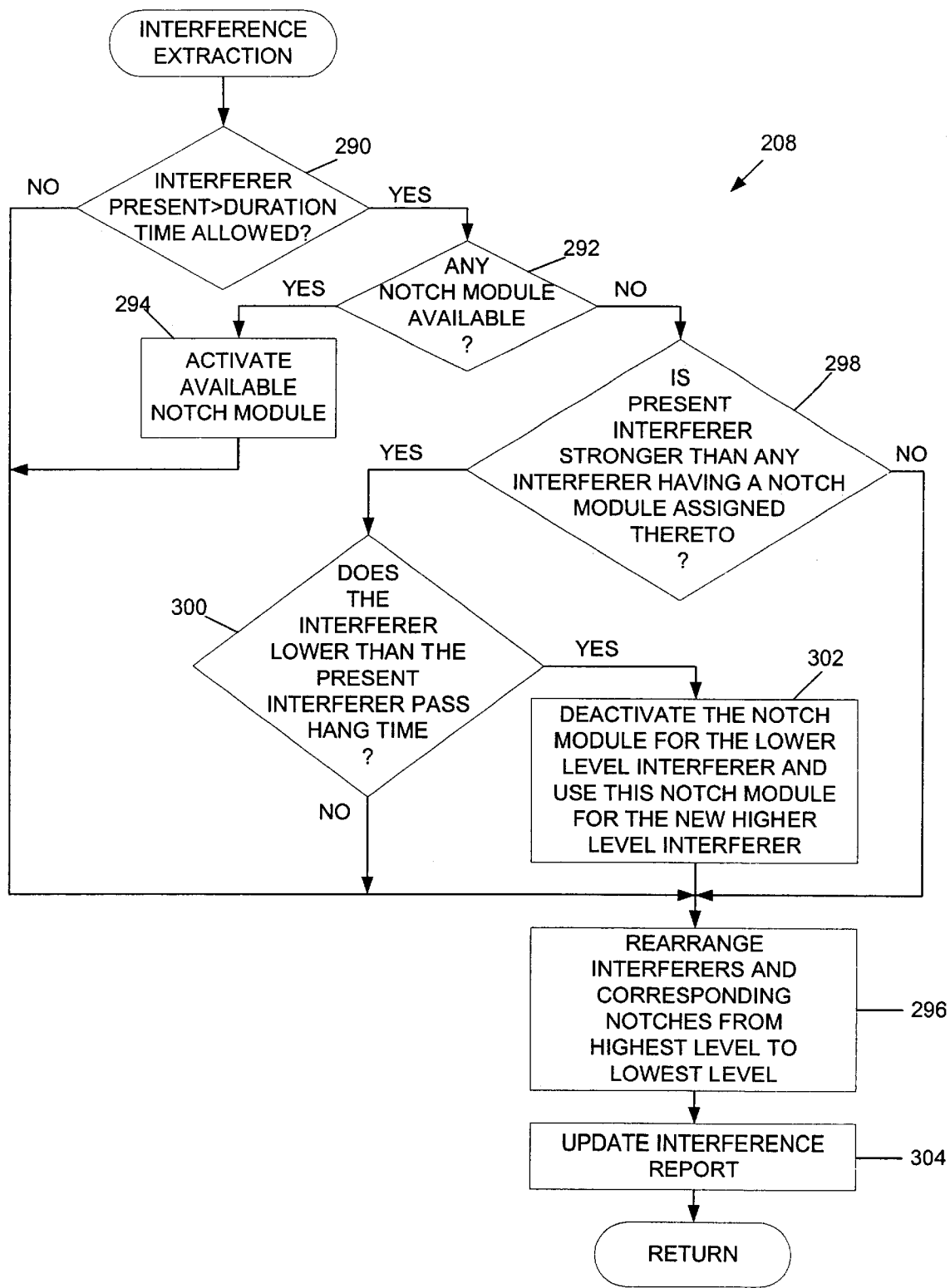
FIG. 14 is an exemplary flow diagram of an interference extraction routine executed by the microcontroller of FIG. 6.

As shown in FIG. 14, the interference extraction routine 208 begins execution at a block 290, which compares the time duration that an interferer has been present with a reference time called "duration time allowed," which may also be referred to as "attack time." If the interferer has been present longer than the attack time, control passes to a block 292. Alternatively, if the interferer has not been present longer than the duration time allowed, control passes to a block 296, which is described in further detail below. Essentially, the block 290 acts as a hysteresis function that prevents filters from being assigned to temporary interferers immediately as such interferers appear. Typically, the duration time allowed may be on the order of 20 ms, which is approximately the frame rate of a CDMA communication system. As will be readily appreciated by those having ordinary skill in the art, the frame rate is the rate at which a base station and a mobile unit exchange data. For example, if the frame rate is 20 ms, the mobile unit will receive a data burst from the base station every 20 ms. The block 290 accommodates mobile units that are in the process of initially powering up. As will be appreciated by those having ordinary skill in the art, mobile units initially power up with a transmit power that is near the mobile unit transmit power limit. After the mobile unit that has initially powered up establishes communication with a base station, the base station may instruct the mobile unit to reduce its transmit power. As the mobile unit reduces its transmit power, the mobile unit may cease to be an interference source to a base station having an multiple carrier ANF module. Accordingly, the block 290 prevents the multiple carrier ANF module 100 from assigning a notch module 110, 112 to an interferer that will disappear on its own within a short period of time.

At the block 292, the microcontroller 106 determines whether there are any notch modules 110, 112 that are presently not used to filter an interferer. If there is a notch module available, control passes from the block 292 to a block 294, which activates an available notch module and tunes that notch module to filter the interferer that is present in the wideband signal from the splitter 24. After the block 294 has completed execution, control passes to the block 296, which is described below.

If, however, the block 292 determines that there are no notch modules available, control passes from the block 292 to a block 298, which determines whether the present interferer is stronger than any interferer to which a notch module is presently assigned. Essentially, the block 298 prioritizes notch modules so that interferers having the strongest signal levels are filtered first. If the block 298 determines that the present interferer is not stronger than any other interferer to which a notch module is assigned, control passes from the block 298 to the block 296.

Alternatively, if the present interferer is stronger than an interferer to which a notch module is assigned, control passes from the block 298 to a block 300. The block 300 determines whether the interferer that is weaker than the present interferer passes a hang time test. The hang time test is used to prevent the multiple carrier ANF module 100 from de-assigning a notch module 110, 112 from an interferer when the interferer is in a temporary fading situation. For example, if a mobile unit is generating interference and a notch module 110, 112 has been assigned to filter that interference, when the mobile unit enters a fading situation in which the interference level is detected at an multiple carrier ANF module 100 becomes low, the multiple carrier ANF module 100 does not de-assign the notch module being used to filter the fading interference until the interference has not been present for a time referred to as hang time. Essentially, hang time is a hysteresis function that prevents notch modules from being rapidly de-assigned from interferers that are merely temporarily fading and that will return after time has passed. Accordingly, if the interferer that is weaker than the present interferer passes hang time, control passes to a block 302. Alternatively, if the interferer weaker than the present interferer does not pass hang time, the block 300 passes controlled to the block 296.

At the block 302, the microcontroller 106 deactivates the notch module being used to filter the weaker interferer and reassigns that same notch module to the stronger interferer. After the block 302 has completed the reassignment of the notch module, control passes to the block 296.

At the block 296, the microcontroller 106 rearranges interferers from lowest level to highest level and assigns notches to the highest level interferers. As with the block 298, the block 296 performs prioritizing functions to ensure that the strongest interferers are filtered with notch modules. Additionally, the block 296 may analyze the interference pattern detected by the multiple carrier ANF module 100 and may assign filters 172–178 having various notch widths to filter interferers. For example, if the multiple carrier ANF module 100 detects interference on contiguous channels collectively have a bandwidth of 50 KHz, the 50 KHz filter 176 of the notch filter block 158 may be used to filter such interference, rather than using four 15 KHz filters. Such a technique essentially frees up notch filter modules 110, 112 to filter additional interferers.

After the block 296 has completed execution, control passes to a block 304, which updates interference data by sending a list of channels and their interference status to a memory (e.g., the memory 118 or 120) that may be accessed by the OA&M processor 108. After the block 304 has completed execution, the interference extraction routine 208 returns control to the main module 200, which continues execution at the block 210.

Figure 15:
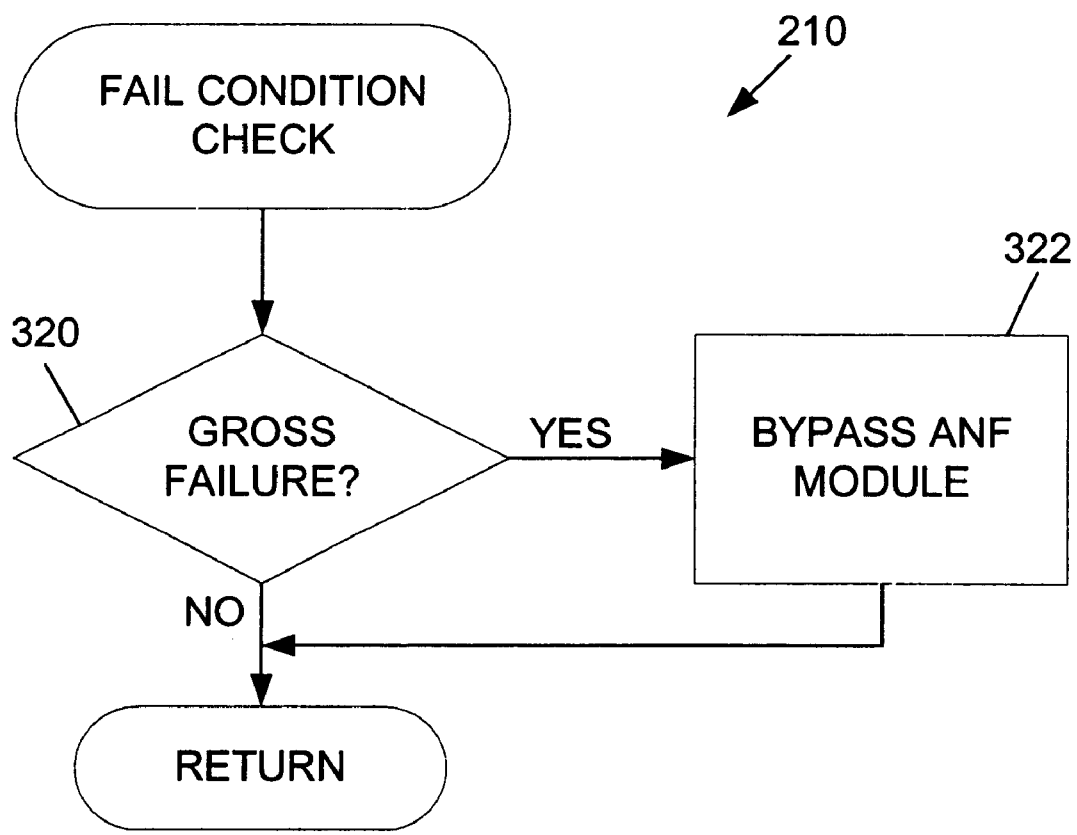
FIG. 15 is an exemplary flow diagram of a fail condition check routine executed by the microcontroller of FIG. 6.

At the block 210, as shown in FIG. 15, the microcontroller 106 determines if a gross failure has occurred in the multiple carrier ANF module 100. Such a determination may be made by, for example, determining if a voltage output from a voltage regulator of the multiple carrier ANF module 100 has an appropriate output voltage. Alternatively, gross failures could be determined by testing to see if each of the notch modules 110, 112 are inoperable. If each of the notch modules is inoperable, it is likely that a gross failure of the multiple carrier ANF module 100 has occurred. Either way, if a gross failure has occurred, control passes from the block 220 to a block 222 at which point the microcontroller 106 enables the bypass switch 116 of FIG. 6 to bypass all of the notch modules 110, 112 of the multiple carrier ANF module 100, thereby effectively connecting the splitter 24 directly to the wideband receiver 30. After the execution of the block 222, or if the block 220 determines that a gross failure has not occurred, control passes back to the main routine 200, which continues execution at the block 212. At the block 212, the interference data that was written to the memory 118 or 120, is passed to the OA&M processor 108.

Figure 16A:
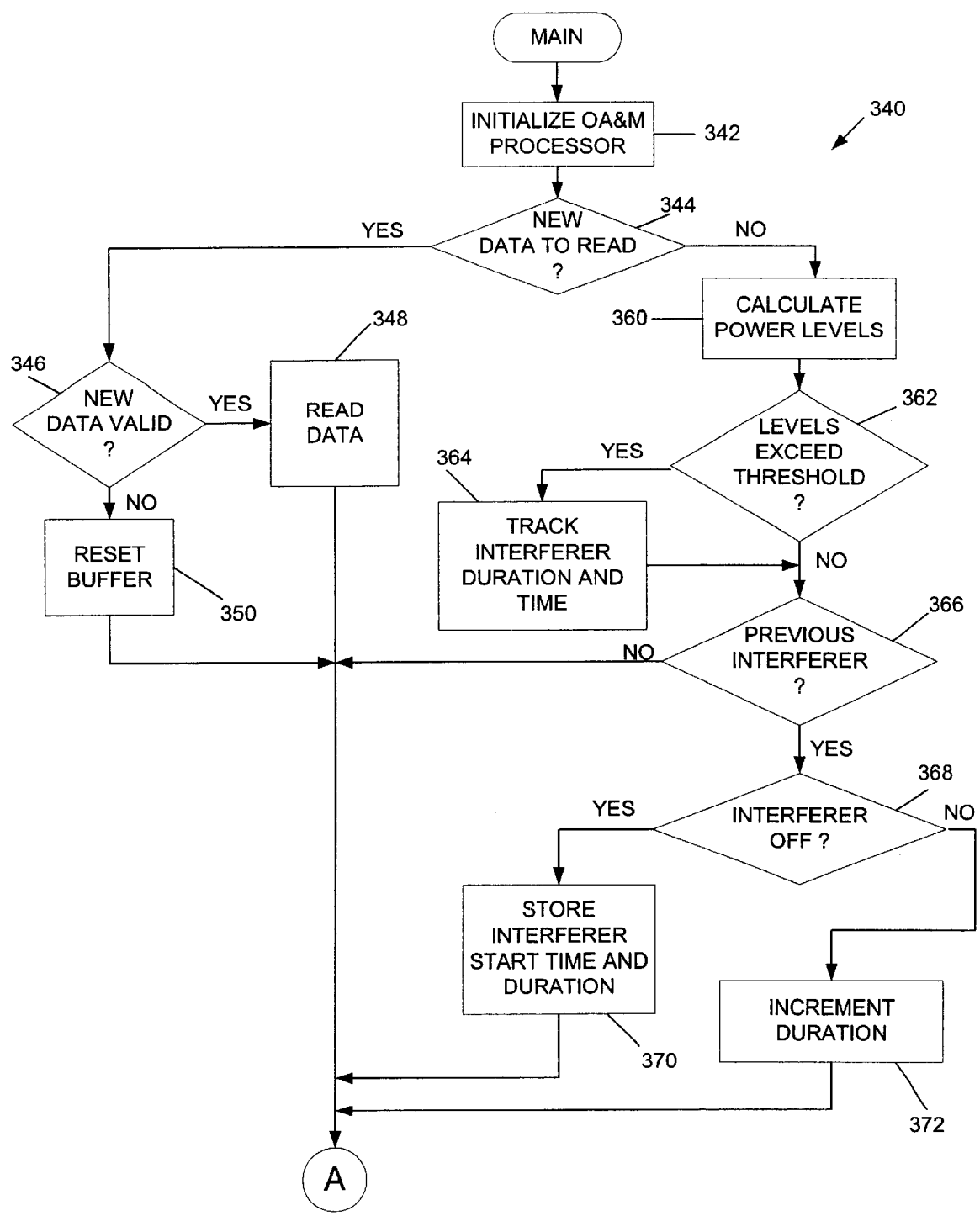
FIGS. 16A and 16B form an exemplary flow diagram of a main routine executed by the operations, alarms and metrics (OA&M) processor of FIG. 6.
Figure 16B:
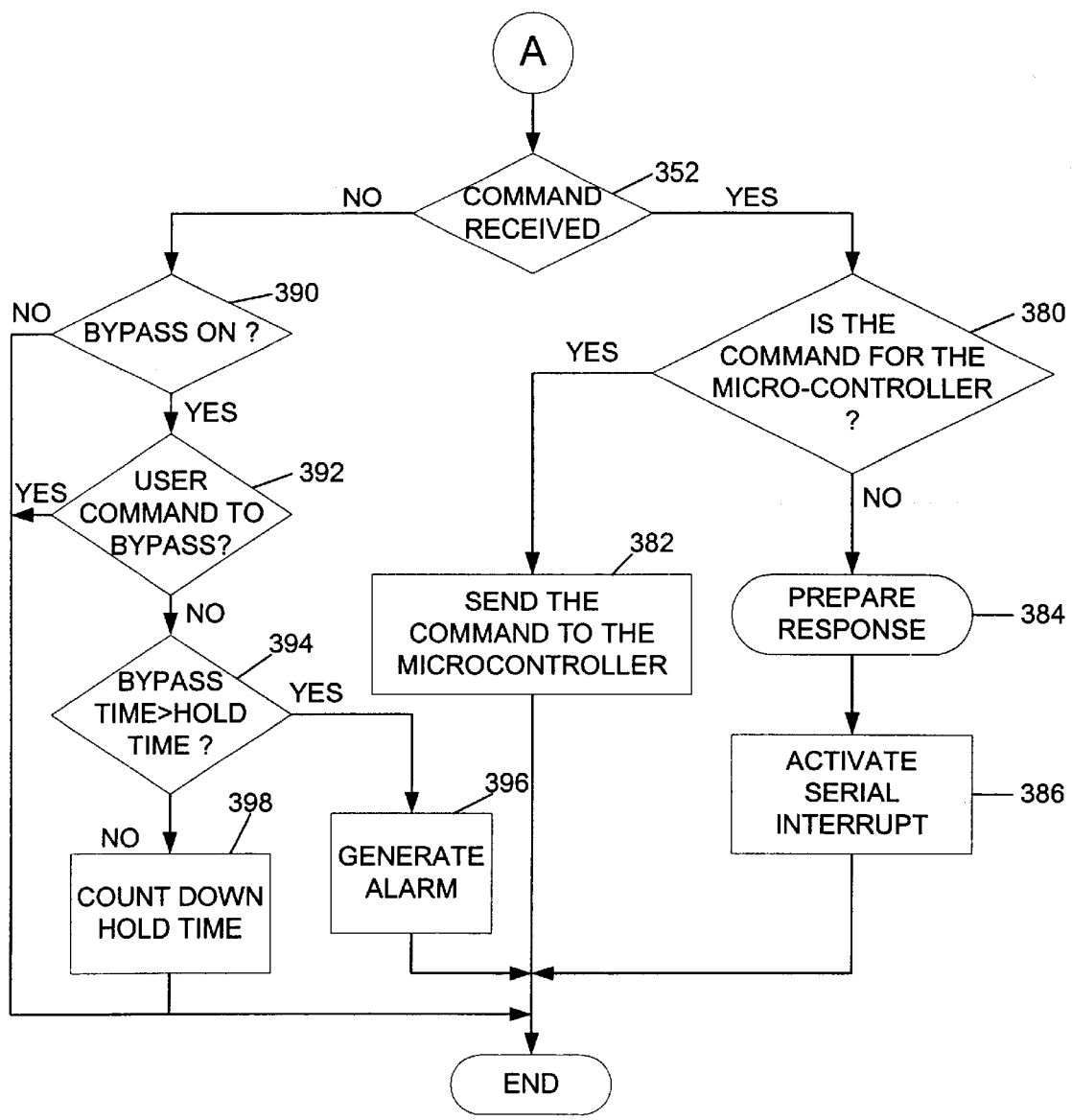

Having described the functionality of the software that may be executed by the microcontroller 106, attention is now turned to the OA&M processor 108 of FIG. 6. If the blocks shown in FIG. 16 represent software functions, instructions embodying the functions may be written as routines in a high level language such as, for example, C, or any other suitable high level language, and may be compiled into a machine readable format. Alternatively, instructions representative of the blocks may be written in assembly code or in any other suitable language. Such instructions may be stored within the OA&M processor 108 or may be stored within the external memory 120 and may be recalled therefrom for execution by the OA&M controller 108.

In particular, as shown in FIGS. 15A and 15B, which are referred to herein collectively as FIG. 16, a main routine 340 executed by the OA&M processor 108 may begin execution at a block 342, at which the OA&M processor 108 is initializes itself by establishing communication, checking alarm status and performing general housekeeping tasks. At the block 342, the OA&M processor 108 is initialized and passes control to a block 344.

At the block 344, the OA&M processor 108 determines whether there is new data to read from an OA&M buffer (not shown). If the block 344 determines that there is new data to read, control passes to a block 346, which determines if the new data is valid. If the new data is valid, control passes from the block 346 to a block 348, which read the data from the OA&M buffer. Alternatively, if the block 346 determines that the new data is not valid, control passes from the block 346 to a block 350, which resets the OA&M buffer. After the execution of either the block 348 or the block 350, control passes to a block 352, which is described in further detail hereinafter.

Returning to the block 344, if the block 344 determines that there is no new data to be read, control passes to a block 360, which calculates power levels of each of the channels scanned by the multiple carrier ANF module 100. The OA&M processor 108 is able to calculate power levels at the block 360 because the data generated as the microcontroller 106 of the multiple carrier ANF module 100 scans the various channels is stored in a buffer that may be read by the OA&M processor 108.

After the power levels have been calculated at the block 360, control passes to a block 362, which determines if the any of the calculated power levels exceed a predetermined threshold. If the calculated power levels do exceed the predetermined threshold, control passes from the block 362 to a block 364, which tracks the duration and time of the interferer before passing control to a block 366. Alternatively, if the block 362 determines that none of the power levels calculated to the block 360 exceed the predetermined threshold, control passes from the block 362 directly to the block 366.

The block 366 determines whether the interferer being evaluated was previously denoted as an interferer. If the block 366 determines that the interferer being evaluated was not previously an interferer, control passes to the block 352. Alternatively, the block 366 passes control to a block 368.

At the block 368, the OA&M processor 108 determines whether the present interferer was a previous interferer that has disappeared, if so, the OA&M processor 108 passes control to a block 370. Alternatively, if the present interferer has not disappeared, control passes from the block 368 to a block 372.

At the block 370, the OA&M processor 108 stores the interferer start time and duration. Such information may be stored within the OA&M processor 108 itself or may be stored within the external memory 120 of the OA&M processor 108. After the block 370 has completed execution, control passes to the block 352. At the block 372, the duration of the interferer is incremented to represent the time that the interferer has been present. After the execution of block 372, control passes to the block 352.

The block 352 determines whether a command has been received at the OA&M processor 108 from the reporting and control facility. If such a command has been received, control passes from the block 352 to a block 380. At the block 380, the OA&M processor 108 determines if the command is for the microcontroller 106 of the multiple carrier ANF module 100, or if the command is for the OA&M processor 108. If the command is for the microcontroller 106, control passes from the,block 380 to a block 382, which sends the command to the microcontroller 106. After the execution of the block 382, the main routine 340 ends.

Alternatively, if the command received by the OA&M processor 108 is not a command for the microcontroller 106, control passes from the block 380 to a block 384, which prepares a response to the command. Responses may include simple acknowledgments or may include responses including substantive data that was requested. Further detail on the block 384 is provided in conjunction with FIG. 17. After the block 384 has prepared a response, a block 386 activates the serial interrupt of the OA&M processor 108 and ends execution of the main routine 340.

Alternatively, if the block 352 determines that a command was not received, control passes from the block 352 to a block 390, which determines if the bypass switch 116 of FIG. 6 is closed (i.e., the bypass is on). If the block 390 determines that the bypass is not on, the execution of the main routine 340 ends. Alternatively, if the block 390 determines that the bypass is on, control passes from the block 390 to a block 392.

At the block 392, the OA&M processor 108 determines whether there was a prior user command to bypass the multiple carrier ANF module 100 using the bypass switch 116. If such a user command was made, execution of the main routine 340 ends. Alternatively, if there was no prior user command bypass the multiple carrier ANF module 100, control passes from the block 392 to a block 394, which compares the bypass time to a hold time. If the bypass time exceeds the hold time, which may be, for example, one minute, control passes from the block 394 to a block 396.

At the block 396, an alarm is generated by the OA&M processor 108 and such an alarm is communicated to a reporting and control facility by, for example, pulling a communication line connected to the reporting and control facility to a 24 volt high state. After the execution of the block 396, the main routine 340 ends.

Alternatively, if the block 394 determines that the bypass time has not exceeded the hold time, control passes from the block 394 to a block 398, which counts down the hold time, thereby bringing the bypass time closer to the hold time. Eventually, after the block 398 sufficiently decrements the hold time, the block 394 will determine that the bypass time does exceed the hold time and pass control to the block 396. After the block 398 has completed execution, the main routine 340 ends.

Figure 17:
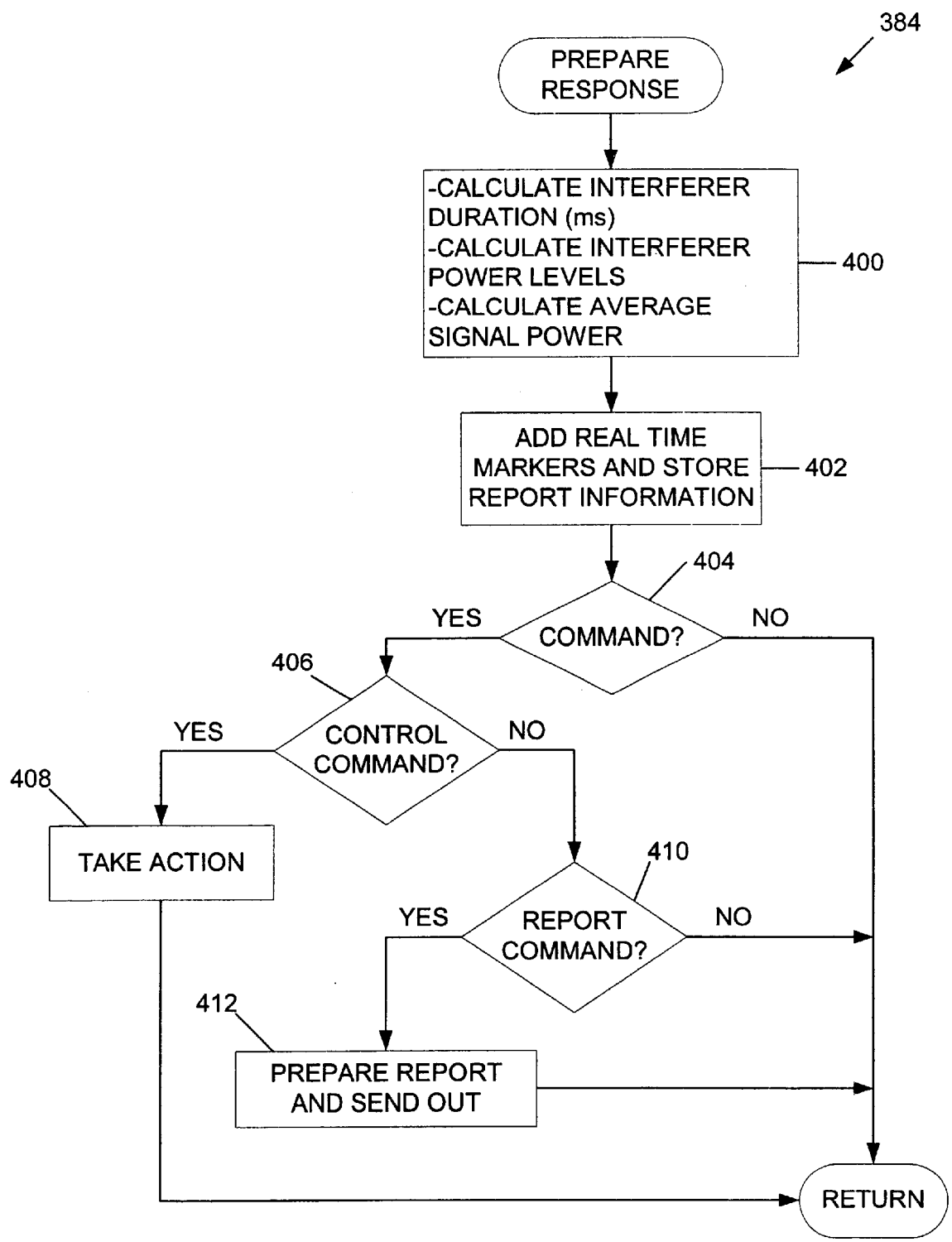
FIG. 17 is an exemplary flow diagram of a prepare response routine executed by the OA&M processor of FIG. 6.

As shown in FIG. 17, the prepare response routine 384 begins execution at a block 400. At the block 400, the OA&M processor 108 reads information that the microcontroller 106 has written into a buffer (e g., the memory 118 or 120) and calculates the duration of the interferers that are present, calculates interferer power levels and calculates the average signal power. This information may be stored locally within the multiple carrier ANF module 100 or may be reported back to a network administrator in real time. Such reporting may be performed wirelessly, over dedicated lines or via an Internet connection. The interferer power levels and the average signal power may be used to evaluate the spectral integrity of a geographic area to detect the presence of any fixed interferers that may affect base station performance. Additionally, such information may be used to correlate base station performance with the interference experienced by the base station. After the block 400 completes execution, control passes through a block 402.

At the block 402, the OA&M processor 108 adds real time markers to the information calculated in the block 400 and stores the report information including the real time markers and the information calculated in the block 400. Such information may be stored within the OA&M processor 108 itself or may be stored within the external memory 120 of the OA&M processor 108.

After the block 402 has completed execution, control passes to a block 404, which determines whether a command has been received by the multiple carrier ANF module 100. Such commands would be received from a reporting and control facility. If the block 404 determines that no command has been received by the OA&M processor 108, control passes from the block 404 back to the main routine 340, which continues execution at the block 386.

Alternatively, if the block 404 determines that a command has been received by the OA&M processor 108, control passes from the block 404 to a block 406, which determines if the received command is a control command that would be used to control the operation of the multiple carrier ANF module 100 from a remote location, such as the reporting and control facility. If the block 406 determines that the command received is a control command, the block 406 transfers control to a block 408 which takes the action prescribed by the command. Commands may include commands that, for example, commands that enable or disable remote control of the multiple carrier ANF module 100, or may include any other suitable commands. After the execution of the block 408, control passes from the prepare response routine 384 back to the main routine 340, which then ends execution.

Alternatively, if the block 406 determines that the command received by the OA&M processor 108 is not a control command, control passes from the block 406 to a block 410, which determines if the received command is a report command. If the command was not a report command, the block 410 passes control back to the main routine 340. Alternatively, if the block 410 determines that the received command is a report command, control passes from the block 410 to a block 412, which prepares and sends out the interference report. The interference report may include information that shows the parameters of the most recent 200 interferers that were detected by the multiple carrier ANF module 100 and the information on which the microcontroller 106 wrote to a memory 118, 120 that the OA&M processor 108 accesses to prepare the interference report. The interference report may include the frequency number (channel) on which interference was detected, the RF level of the interferer, the time the interferer appeared, the duration of the interferer and the wideband signal power that was present when the interferer was present.

In addition to the interference report, the OA&M processor 108 may prepare a number of different reports in addition to the interference report. Such additional reports may include: mode reports (report the operational mode of the multiple carrier ANF module 100), status reports (reports alarm and system faults of the multiple carrier ANF module 100), software and firmware version reports, header reports (reports base station name, CDMA carrier center frequency, antenna number and base station sector), date reports, time reports, activity reports (reports frequency number, RF level, interferer start time, interferer duration, and CDMA carrier power) and, summary reports.

The interference report may be used for network system diagnostic purposes including determining when the network administrator should use a narrowband receiver 28 to determine a telephone number that the mobile unit is attempting to contact and, optionally handling the call. For example, the reporting and control facility may use the narrowband receiver 28 to determine that the user of the mobile unit was dialing 911, or any other emergency number, and may, therefore, decide that the narrowband receiver 28 should be used to handle the emergency call by routing the output of the narrowband receiver 28 to a telephone network.

Additionally, the interference report may be used to determine when a network administrator should control the narrowband receiver 28 to obtain particular information relating to an interferer and retasking the interferer by communicating with its base station. For example, the reporting and control facility may use the narrowband receiver 28 to determine the identity of an interferer, such as a mobile unit, by intercepting the electronic serial number (ESN) of the mobile unit, which is sent when the mobile unit transmits information on the narrowband channel. Knowing the identity of the interferer, the reporting and control facility may contact infrastructure that is communicating with the mobile unit and may request the infrastructure to change the transmit frequency of the mobile unit (i.e., the frequency of the narrowband channel on which the mobile unit is transmitting) or may request the infrastructure to drop communications with the interfering mobile unit all together.

Further, the interference reports may be used by a network administrator to correlate system performance with the information provided in the interference report. Such correlations could be used to determine the effectiveness of the multiple carrier ANF module 100 on increasing system capacity.

After the block 412 has completed execution, control passes back to the main routine 340, which continues execution at the block 386.

Figure 18:
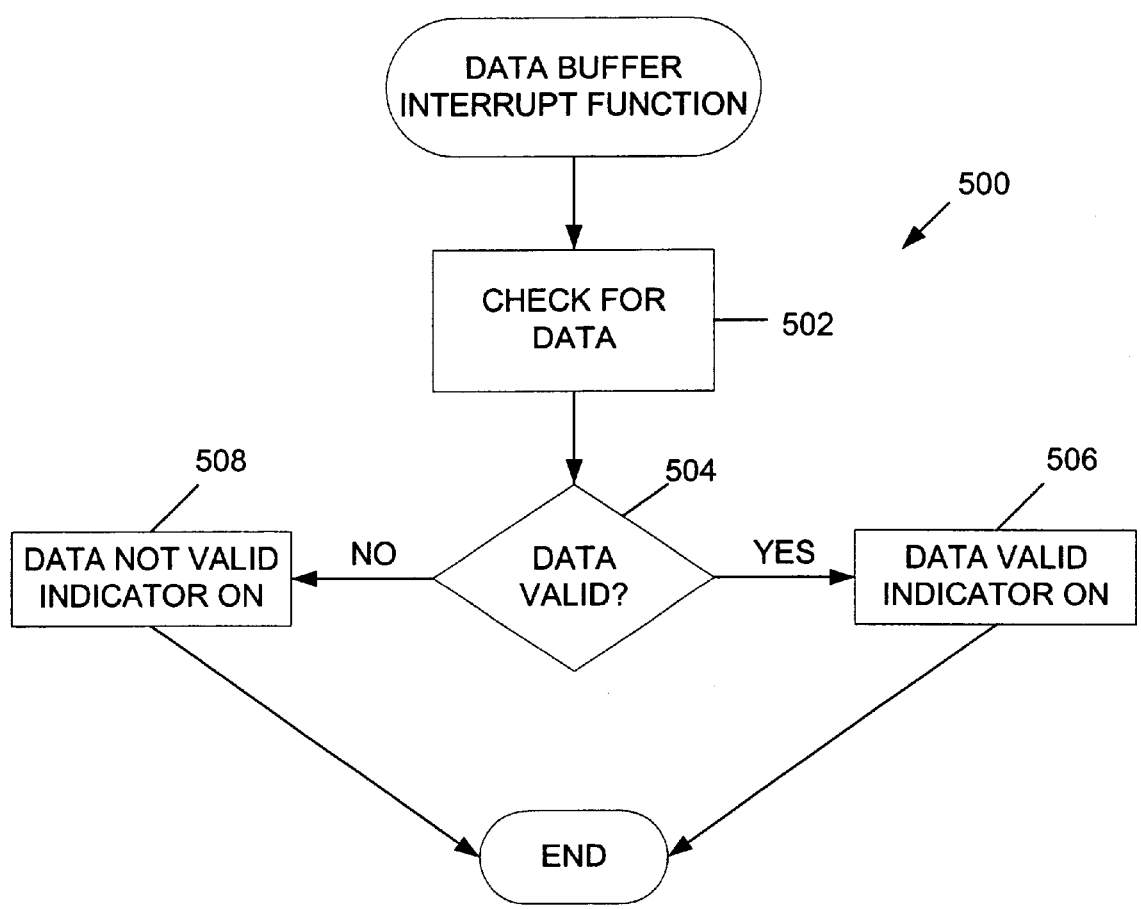
FIG. 18 is an exemplary flow diagram of a data buffer interrupt function executed by the OA&M processor of FIG. 6.

Referring now to FIG. 18, a data buffer interrupt function 500 is executed by the OA&M processor 108 and is used to check for, and indicate the presence of, valid data. The function 500 begins execution at a block 502, which checks for data.

After the execution of the block 502, control passes to a block 504, which checks to see if the data is valid. If the block 504 determines that the data is valid, control passes from the block 504 to a block 506, which sets a valid data indicator before the function 500 ends. Alternatively, if the block 504 determines that the data is not valid, control passes from the block 504 to a block 508, which sets a not valid data indicator before the function 500 ends.

Numerous modifications and alternative embodiments of the invention will be apparent to those skilled in the art in view of the foregoing description. For example, while the foregoing description specifically addressed the concept of eliminating interference from signals on 30 KHz narrowband channels interfering with a 1.25 MHz CDMA carrier signal, it will be readily appreciated that such concepts could be applied to CDMA carrier signals having, for example, 5, 10 or 15 MHz bandwidths or to contiguous channels that have an aggregate bandwidth of, for example, 5, 10 or 15 MHz. To accommodate such wider bandwidths, banks of downconverters may be operated in parallel to cover 1.25 MHz block of the channel. Accordingly, this description is to be construed as illustrative only and not as limiting to the scope of the invention. The details of the structure may be varied substantially without departing from the spirit of the invention, and the exclusive use of all modifications, which are within the. scope of the appended claims, is reserved.

What is claimed is:

1. A method of detecting narrowband interference in a first wideband communication signal having a frequency bandwidth with narrowband channels disposed therein, the method comprising:

scanning at least some of the narrowband channels to determine signal strengths in at least some of the narrowband channels;

weighting a signal strength of at least one of the narrowband channels by a first weight to get a first weighted signal strength;

determining a threshold based on a statistical combination of the signal strengths of more than one of the narrowband channels including the first weighted signal strength; and identifying the narrowband channels having signal strengths exceeding the threshold.

2. A method as defined in claim 1, wherein weighting the signal strength comprises multiplying a signal strength of a first narrowband channel near a first edge of the first wideband communication signal by the first weight to get a first edge weighted signal strength.

3. A method as defined in claim 2, wherein weighting the signal strength further comprises multiplying a signal strength of a second narrowband channel near a second edge of the first wideband communication signal by a second weight to get a second edge weighted signal strength.

4. A method as defined in claim 3, wherein the first weight is equal to the second weight.

5. A method as defined in claim 3, wherein the first weight and the second weight has a value of eight.

6. A method as defined in claim 3, wherein the value of the first weight and the value of the second weight is determined based on signal strengths of at least some of the narrowband channels.

7. A method as defined in claim 3, wherein the value of the first weight and the value of the second weight is determined based on signal strength of the first wideband communication signal.

8. A method as defined in claim 3, wherein the threshold is determined by adding the first edge weighted signal strength, the second edge weighted signal strength, and a statistical combination the signal strengths of the narrowband channels disposed within the first wideband communication signal other than the first narrowband channel and the second narrowband channel, to get a first weighted sum of narrowband channel signal strengths, and dividing the first weighted sum of narrowband channel signal strengths by the first total number of narrowband channels disposed within the first wideband communication signal.

9. A method as defined in claim 1, wherein determining the threshold comprises adding an offset to the statistical combination of the signal strengths of more than one of the narrowband channels including the first weighted signal strength.

10. A method as defined in claim 1, wherein determining the threshold comprises omitting a first number of largest narrowband signal strengths in the statistical combination of the signal strengths of more than one of the narrowband channels.

11. A method as defined in claim 1, wherein the first wideband communication signal has one or more adjacent wideband communication signals.

12. A method as defined in claim 1, further comprising filtering the first wideband communication signal for at least one frequency corresponding to a narrowband channel having a signal strength exceeding the threshold.

13. A method as defined in claim 12, wherein filtering the first wideband communication signal comprises filtering only a first set of narrowband channels having highest signal strengths among all the narrowband channels having signal strengths exceeding the threshold.

14. A method as defined in claim 12, wherein filtering the first wideband communication signal comprises filtering only a second set of narrowband channels selected based on a difference in signal strength between the signal strengths of the first wideband communication signal and the signal strength of the narrowband channel.

15. A method as defined in claim 12, wherein the narrowband channel having a signal strength exceeding the threshold is filtered for a first bandwidth of the narrowband channel.

16. A method as defined in claim 12, wherein the narrowband channel is filtered only if the narrowband channel is identified as having a signal strength exceeding the threshold for at least a first time duration.

17. A method as defined in claim 12, wherein the narrowband channel is filtered only if the narrowband channel is identified as having a signal strength exceeding the threshold for a first number of occurrences.

18. A method as defined in claim 12, wherein the first wideband communication signal is a CDMA carrier signal.

19. A method as defined in claim 15, wherein the first bandwidth of the narrowband channel comprises a variable bandwidth.

20. A method as defined in claim 16, wherein the first time duration comprises a variable time duration.

21. A method as defined in claim 17, wherein the first number of occurrences comprises a variable number of occurrences.

22. A system adapted to detect narrowband interference in a first wideband communication signal having a frequency bandwidth with narrowband channels disposed therein, the system comprising:
a scanner adapted to scan at least some of the narrowband channels to determine signal strengths in at least some of the narrowband channels;
a controller coupled to the scanner, and adapted to control the scanner to scan at least some of the narrowband channels to determine signal strengths in at least some of the narrowband channels, to weight signal strength of at least one of the narrowband channels by a first weight to get a first weighted signal strength, to determine a threshold based on a statistical combination of the signal strengths of more than one of the narrowband channels including the first weighted signal strength, and to identify the narrowband channels having signal strengths exceeding the threshold.

23. The system of claim 22, further comprising a notch module coupled to the controller module and adapted to receive the first wideband communication signal and to selectively filter at least one frequency corresponding to a narrowband channel having a signal strength exceeding the threshold.

24. The system of claim 22, wherein the controller is further adapted to multiply a signal strength of a first narrowband channel near a first edge of the first wideband communication signal by the first weight to get a first edge weighted signal strength.

25. The system of claim 22, wherein the controller determines the threshold by adding an offset to the statistical combination of the signal strengths of more than one of the narrowband channels including the first weighted signal strength.

26. The system of claim 22, wherein the controller omits a first number of largest narrowband signal strengths in the statistical combination of the signal strengths of more than one of the narrowband channels.

27. The system of claim 22, wherein the controller is adapted to have one or more wideband communication signals adjacent to the first wideband communication signal.

28. The system of claim 24, wherein the controller is further adapted to multiply a signal strength of a second narrowband channel near a second edge of the first wideband communication signal by a second weight to get a second edge weighted signal strength.

29. The system of claim 28, wherein the first weight is equal to the second weight.

30. The system of claim 28, wherein the first, weight and the second weight has a value of eight.

31. The system of claim 28, wherein the value of the first weight and the value of the second weight is determined based on signal strengths of at least some of the narrowband channels.

32. The system of claim 28, wherein the value of the first weight and the value of the second weight is determined based on signal strength of the first wideband communication signal.

33. The system of claim 28, wherein the threshold is determined by adding the first edge weighted signal strength, the second edge weighted signal strength, and a statistical combination the signal strengths of the narrowband channels disposed within the first wideband communication signal other than the first narrowband channel and the second narrowband channel, to get a first weighted sum of narrowband channel signal strengths, and dividing the first weighted sum of narrowband channel signal strengths by the first total number of narrowband channels disposed within the first wideband communication signal.

34. The system of claim 23, wherein the notch module filters only a first set of narrowband channels having highest signal strength among all the narrowband channels having a signal strengths exceeding the threshold.

35. The system of claim 23, wherein the notch module filters only a second set of narrowband channels selected based on a difference in signal strength between the signal strength of the first wideband communication signal and the signal strength of the narrowband channel.

36. The system of claim 23, wherein the notch module filters a frequency corresponding to a narrowband channel having a signal strength exceeding the threshold for a first bandwidth of the narrowband channel.

37. The system of claim 23, wherein the notch module filters a frequency corresponding to a narrowband channel if the narrowband is identified as having a signal strength exceeding the threshold for at least a first time duration.

38. The system of claim 23, wherein the first time duration comprises a variable time duration.

39. The system of claim 23, wherein the notch module filters a frequency corresponding to a narrowband channel only if the narrowband channel is identified as having a signal strength exceeding the threshold for a first number of occurrences.

40. The system of claim 23, wherein the notch module is a first notch module and the filtered wideband communication signal is a first filtered wideband communication signal, the system further comprising a second notch module adapted to receive the first filtered wideband communication signal from the first notch module and to selectively filter the first filtered wideband communication signal at a frequency corresponding to a narrowband channel having a signal strength that exceeds the threshold to produce a second filtered wideband communication signal.

41. The system of claim 23, wherein the first wideband communication signal is a CDMA carrier signal.

42. The system of claim 33, wherein the first bandwidth of the narrowband channel comprises a variable bandwidth.

43. The system of claim 34, wherein the first number of occurrences comprises a variable number or occurrences.

44. A method for detecting narrowband interference in a multicarrier communication signal including a plurality of carriers, wherein each carrier has a plurality of narrowband channels disposed therein, the method comprising:

scanning a number of narrowband channels associated with a selected carrier of the plurality of carriers to determine signal strengths for the number of scanned narrowband channels within the selected carrier;

identifying a number of narrowband channels having the largest signal strengths within a bandwidth of the multicarrier communication signal;

determining a number of narrowband channels identified as having the largest signal strengths within the bandwidth of the multicarrier communication signal that lie within a bandwidth of the selected carrier;

determining a weighted sum of the signal strengths of the narrowband channels associated with the selected carrier, the weighted sum not including the signal strengths of the number of narrowband channels having the largest signal strengths that lie with the bandwidth of the selected carrier;

determining a threshold for the selected carrier by dividing the weighted sum by a difference between the number of narrowband channels scanned within the selected carrier and the number of narrowband channels having the largest signal strengths that lie within the bandwidth of the selected carrier and adding an offset thereto;

comparing to the threshold the signal strengths for each narrowband channel scanned within the selected carrier; and indicating that narrowband channels having signal strengths exceeding the threshold include interference.

45. A method as defined in claim 44, further comprising filtering the multicarrier communication signal for at least one frequency corresponding to the narrowband channel having a signal strength exceeding the threshold.

46. A method as defined in claim 44, wherein determining the weighted sum comprises multiplying the signal strengths of the narrowband channels near the edge of the selected carrier by a first weight and multiplying the signal strengths of the narrowband channels not near the edge of the selected carrier by a second weight.

47. A method as defined in claim 46, wherein the first weight is higher than the second weight.

48. A method as defined in claim 46, wherein the first weight is equal to eight.

49. A method for detecting narrowband interference in a multicarrier communication signal including a plurality of carriers, wherein each carrier has a plurality of narrowband channels disposed therein, the method comprising:

scanning a number of narrowband channels associated with a selected carrier of the plurality of carriers to determine signal strengths for the number of scanned narrowband channels associated with the selected carrier;

identifying a number of narrowband channels having the largest signal strengths within a bandwidth of the selected carrier;

determining a weighted sum of the signal strengths of the number of narrowband channels associated with the selected carrier;

determining a threshold for the selected carrier by dividing the weighted sum by the difference between the number of narrowband channels associated with the selected carrier signal and the number of narrowband channels having the largest signal strength within a bandwidth of the selected carrier;

comparing to the threshold the signal strengths for the number of narrowband channel scanned within the selected carrier; and indicating that narrowband channels having signal strengths exceeding the threshold include interference.

50. A method as defined in claim 49, further comprising filtering the multicarrier communication signal for at least one frequency corresponding to the narrowband channel having a signal strength exceeding the threshold.

51. A method as defined in claim 49, wherein determining the weighted sum comprises multiplying the signal strengths of the narrowband channels near the edge of the selected carrier by a first weight and multiplying the signal strengths of the narrowband channels not near the edge of the selected carrier by a second weight.

52. A method as defined in claim 51, wherein the first weight is higher than the second weight.

53. A method as defined in claim 51, wherein the first weight is equal to eight.

* * * * *

UNITED STATES PATENT AND TRADEMARK OFFICE
CERTIFICATE OF CORRECTION

PATENT NO. : 6,718,166 B2
DATED : April 6, 2004
INVENTOR(S) : Sean S. Cordone et al.

It is certified that error appears in the above-identified patent and that said Letters Patent is hereby corrected as shown below:

Column 24,
Line 8, please delete "first," and insert -- first --.
Line 31, please delete "strengths" and insert -- strength --.
Line 67, please delete "or" and insert -- of --.

Column 26,
Line 28, please delete "channel" and insert -- channels --.

Signed and Sealed this

Third Day of August, 2004

JON W. DUDAS
*Acting Director of the United States Patent and Trademark Office*